(12) United States Patent
Kim et al.

(10) Patent No.: US 10,587,316 B2
(45) Date of Patent: Mar. 10, 2020

(54) FEEDBACK METHOD OF HYBRID CSI IN MULTI-ANTENNA COMMUNICATION SYSTEM AND DEVICE THEREFOR

(71) Applicant: LG ELECTRONICS INC., Seoul (KR)

(72) Inventors: Hyungtae Kim, Seoul (KR); Jonghyun Park, Seoul (KR); Haewook Park, Seoul (KR); Daesung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/309,433

(22) PCT Filed: Jul. 5, 2017

(86) PCT No.: PCT/KR2017/007172
§ 371 (c)(1),
(2) Date: Dec. 12, 2018

(87) PCT Pub. No.: WO2018/008974
PCT Pub. Date: Jan. 11, 2018

(65) Prior Publication Data
US 2019/0268047 A1   Aug. 29, 2019

Related U.S. Application Data

(60) Provisional application No. 62/454,890, filed on Feb. 5, 2017, provisional application No. 62/422,590, filed (Continued)

(51) Int. Cl.
*H04B 7/0417* (2017.01)
*H04B 7/06* (2006.01)
*H04B 7/0456* (2017.01)

(52) U.S. Cl.
CPC ......... *H04B 7/0417* (2013.01); *H04B 7/0617* (2013.01); *H04B 7/0626* (2013.01); *H04B 7/0456* (2013.01)

(58) Field of Classification Search
CPC .. H04B 7/0417; H04B 7/0617; H04B 7/0626; H04B 7/0456; H04B 7/06
See application file for complete search history.

(56) References Cited

U.S. PATENT DOCUMENTS 9,991,942 B2 * 6/2018 Onggosanusi .... H04W 72/0406
2012/0014349 A1  1/2012 Chung et al.
(Continued)

FOREIGN PATENT DOCUMENTS

WO   2014005624   1/2014

OTHER PUBLICATIONS

PCT International Application No. PCT/KR2017/007172, Written Opinion of the International Searching Authority dated Oct. 17, 2017, 20 pages.
(Continued)

*Primary Examiner* — Vineeta S Panwalkar
(74) *Attorney, Agent, or Firm* — Lee, Hong, Degerman, Kang & Waimey

(57) ABSTRACT

Disclosed in the present invention is a method by which a terminal reports channel status information (CSI) to a base station in a wireless communication system. The method comprises the steps of: receiving, through an upper layer, information on one CSI process having a first enhanced multiple input multiple output (eMIMO) type and a second eMIMO type; receiving a first channel status information-reference signal (CSI-RS) corresponding to the first eMIMO type; periodically reporting, to the base station, first CSI measured on the basis of the first CSI-RS; receiving a second CSI-RS, which corresponds to the second eMIMO type,
(Continued)

beamformed on the basis of the first CSI; and periodically reporting, to the base station, second CSI measured on the basis of the second CSI-RS, wherein a priority of the first CSI is set to be equal to a priority of a CSI-RS resource indicator (CRI).

12 Claims, 14 Drawing Sheets

Related U.S. Application Data on Nov. 16, 2016, provisional application No. 62/423,149, filed on Nov. 16, 2016, provisional application No. 62/421,220, filed on Nov. 12, 2016, provisional application No. 62/420,546, filed on Nov. 10, 2016, provisional application No. 62/417,301, filed on Nov. 3, 2016, provisional application No. 62/401,863, filed on Sep. 29, 2016, provisional application No. 62/377,583, filed on Aug. 20, 2016, provisional application No. 62/376,989, filed on Aug. 19, 2016, provisional application No. 62/358,159, filed on Jul. 5, 2016.

(56) References Cited

U.S. PATENT DOCUMENTS

| | | |
|---|---|---|
| 2013/0336214 A1 | 12/2013 | Sayana et al. |
| 2015/0009928 A1 | 1/2015 | Sohn et al. |
| 2015/0103686 A1 | 4/2015 | Lim et al. |
| 2016/0014758 A1 | 1/2016 | Lee et al. |
| 2018/0034612 A1 | 2/2018 | Lin et al. |
| 2018/0152324 A1 | 5/2018 | Park et al. |
| 2019/0081683 A1 | 3/2019 | Liu et al. |

OTHER PUBLICATIONS

CATT, "CSI reporting for hybrid CSI-RS", 3GPP TSG RAN WG1 Meeting #85, R1-164222, May 2016, 3 pages.
Interdigital, "On Hybrid CSI-RS reporting scheme", 3GPP TSG RAN WG1 Meeting #85, R1-165048, May 2016, 4 pages.
NTT DOCOMO, "CSI Reporting for Hybrid CSI-RS", 3GPP TSG RAN WG1 Meeting #85, R1-165202, May 2016, 4 pages.
PCT International Application No. PCT/KR2017/007173, Written Opinion of the International Searching Authority dated Oct. 24, 2017, 18 pages.
U.S. Appl. No. 16/315,620, Ex-Parte Quayle Office Action dated Jul. 3, 2019, 7 pages.
LG Electronics, "Discussion on CSI reporting enhancements for hybrid CSI-RS", 3GPP TSG RAN WG1 Meeting 185, R1-164526, May 2016, 5 pages.
Nokia, et al., "Hybrid CSI Measurement and Reporting Schemes", 3GPP TSG RAN WG1 Meeting #85, R1-164339, May 2016, 4 pages.
United States Patent and Trademark Office U.S. Appl. No. 16/726,134, Office Action dated Jan. 27, 2020, 7 pages.

* cited by examiner (a) Control-plane protocol stack (b) User-plane protocol stack Reserved processing time for 1st CSI calculation

FEEDBACK METHOD OF HYBRID CSI IN MULTI-ANTENNA COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/007172, filed on Jul. 5, 2017, which claims the benefit of U.S. Provisional Application No. 62/358,159, filed on Jul. 5, 2016, 62/376,989, filed on Aug. 19, 2016, 62/377,583, filed on Aug. 20, 2016, 62/401,863, filed on Sep. 29, 2016, 62/417,301, filed on Nov. 3, 2016, 62/420,546, filed on Nov. 10, 2016, 62/421,220, filed on Nov. 12, 2016, 62/422,590, filed on Nov. 16, 2016, 62/423,149, filed on Nov. 16, 2016, and 62/454,890, filed on Feb. 5, 2017, the contents of which are all hereby incorporated by reference herein in their entirety.

TECHNICAL FIELD

The present invention relates to a wireless communication system, and more particularly, to a method and apparatus for feeding back hybrid channel status information (CSI) in a multi-antenna communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

A method and apparatus for feeding back hybrid channel status information (CSI) in a multi-antenna communication system are proposed below on the basis of the above discussion.

It will be appreciated by persons skilled in the art that that the effects that can be achieved through the present disclosure are not limited to what has been particularly described hereinabove and other advantages of the present disclosure will be more clearly understood from the following detailed description.

Technical Solution

According to an embodiment of the present invention, a method of reporting channel status information (CSI) to a base station by a terminal in a wireless communication system includes receiving information about one CSI process including a first enhanced multiple input multiple output (eMIMO) type and a second eMIMO type through a higher layer, receiving a first channel status information-reference signal (CSI-RS) corresponding to the first eMIMO type, periodically reporting first CSI measured based on the first CSI-RS to the base station, receiving a second CSI-RS corresponding to the second eMIMO type, beamformed based on the first CSI, and periodically reporting second CSI measured based on the second CSI-RS to the base station. A priority of the first CSI is set to be equal to a priority of a CSI-RS resource indicator (CRI).

Meanwhile, according to an embodiment of the present invention, a terminal in a wireless communication system includes a wireless communication module configured to transmit and receive signals to and from a base station, and a processor configured to process the signals. The processor is configured to receive information about one CSI process including a first eMIMO type and a second eMIMO type through a higher layer, to periodically report, to the base station, first CSI measured based on a first CSI-RS corresponding to the first eMIMO type, and to periodically report second CSI measured based on a second CSI-RS corresponding to the second eMIMO type, beamformed based on the first CSI. A priority of the first CSI is set to be equal to a priority of a CRI.

Specifically, if the first CSI including a precoding matrix index (PMI) collides with the second CSI including a rank indicator (RI), the second CSI may be dropped.

Preferably, a reporting period of the first CSI may be determined to be a multiple of a longest reporting period of the second CSI. Herein, the longest reporting period of the second CSI may be a reporting period of an RI included in the second CSI. Further, if the RI is not included in the second CSI, the longest reporting period of the second CSI may be a reporting period of a channel quality indicator (CQI) included in the second CSI.

More preferably, an offset for the reporting period of the first CSI may be determined based on an offset for the longest reporting period of the second CSI.

Advantageous Effects

According to the embodiments of the present invention, feedback of hybrid channel status information (CSI) can be carried out more effectively in a multi-antenna communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

Figure 1:
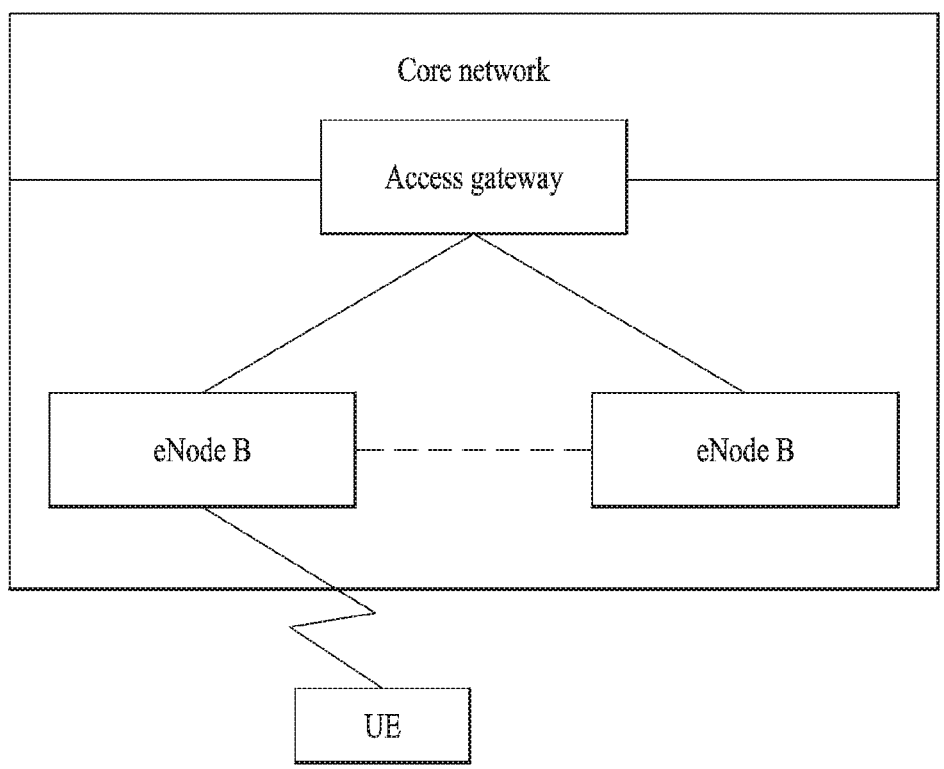
FIG. 1 illustrates a configuration of an evolved universal mobile telecommunications system (E-UMTS) network as an example of a wireless communication system.
Figure 2:
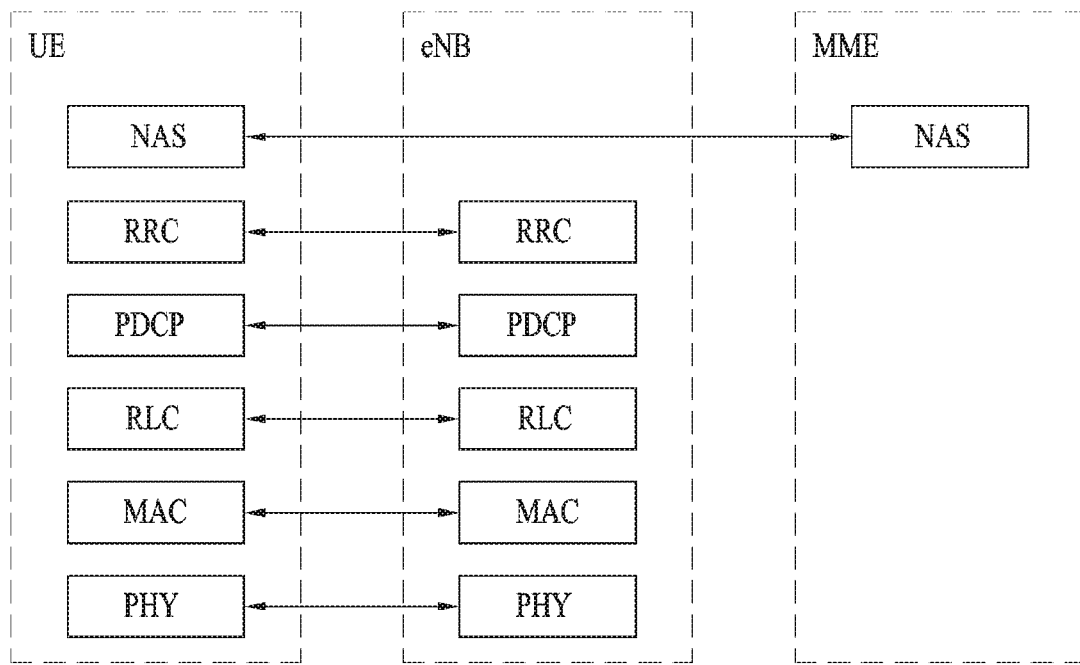
FIG. 2 illustrates a control-plane protocol stack and a user-plane protocol stack in a radio interface protocol architecture conforming to a 3rd generation partnership project (3GPP) radio access network standard between a user equipment (UE) and an evolved UMTS terrestrial radio access network (E-UTRAN)
Figure 2:
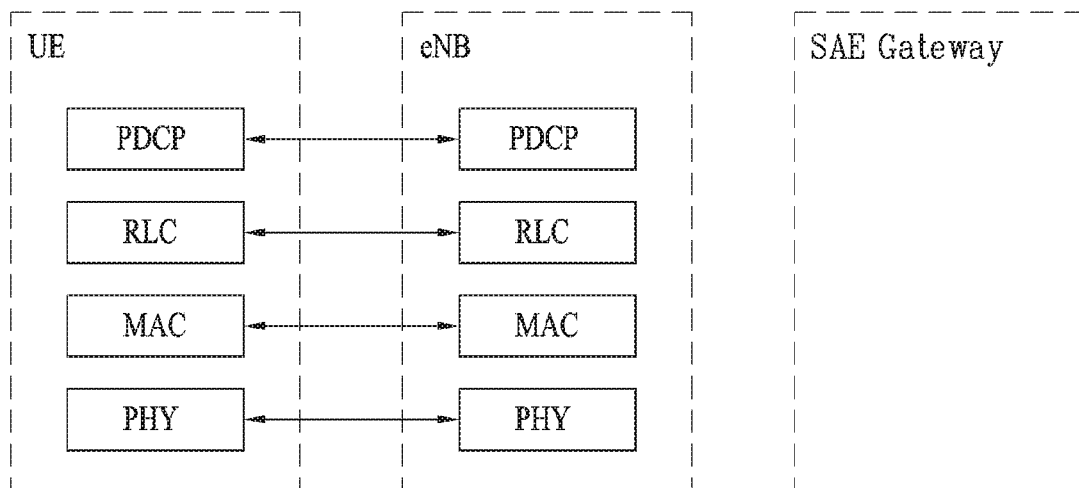

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A packet data convergence protocol (PDCP) layer at L2 performs a header compression function to reduce unnecessary control information for efficient transmission of an Internet protocol (IP) packet such as an IPv4 or IPv6 packet in a radio interface having a relatively narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell managed by an eNB is set to one of the bandwidths of 1.25, 2.5, 5, 10, 15, and 20 MHz, and provides a DL or UL transmission service to a plurality of UEs in the bandwidth. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
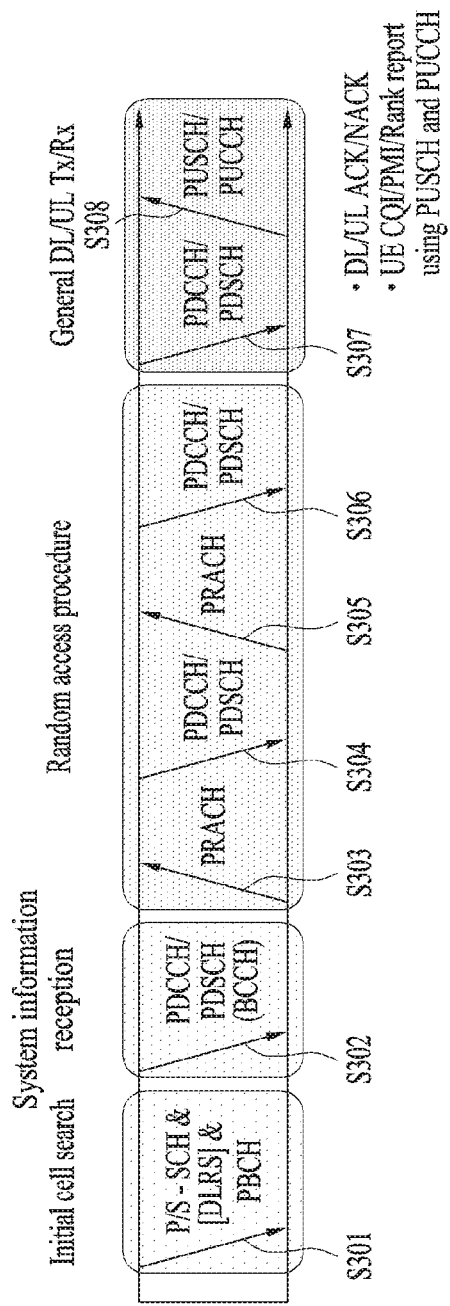
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
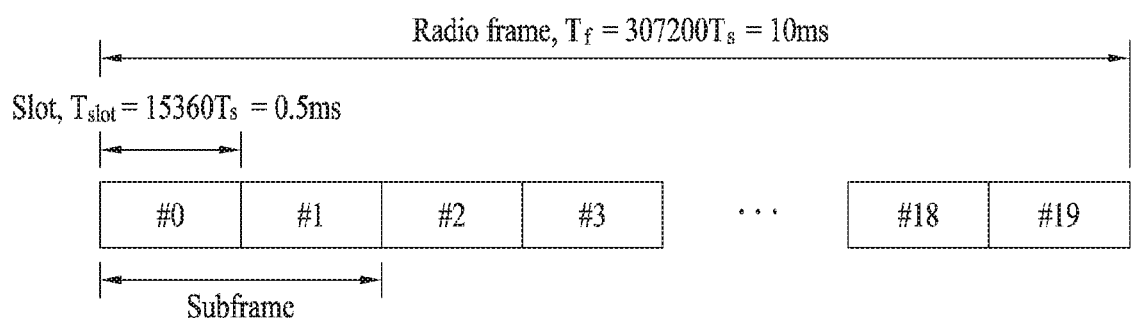
FIG. 4 illustrates a structure of a radio frame in a long term evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
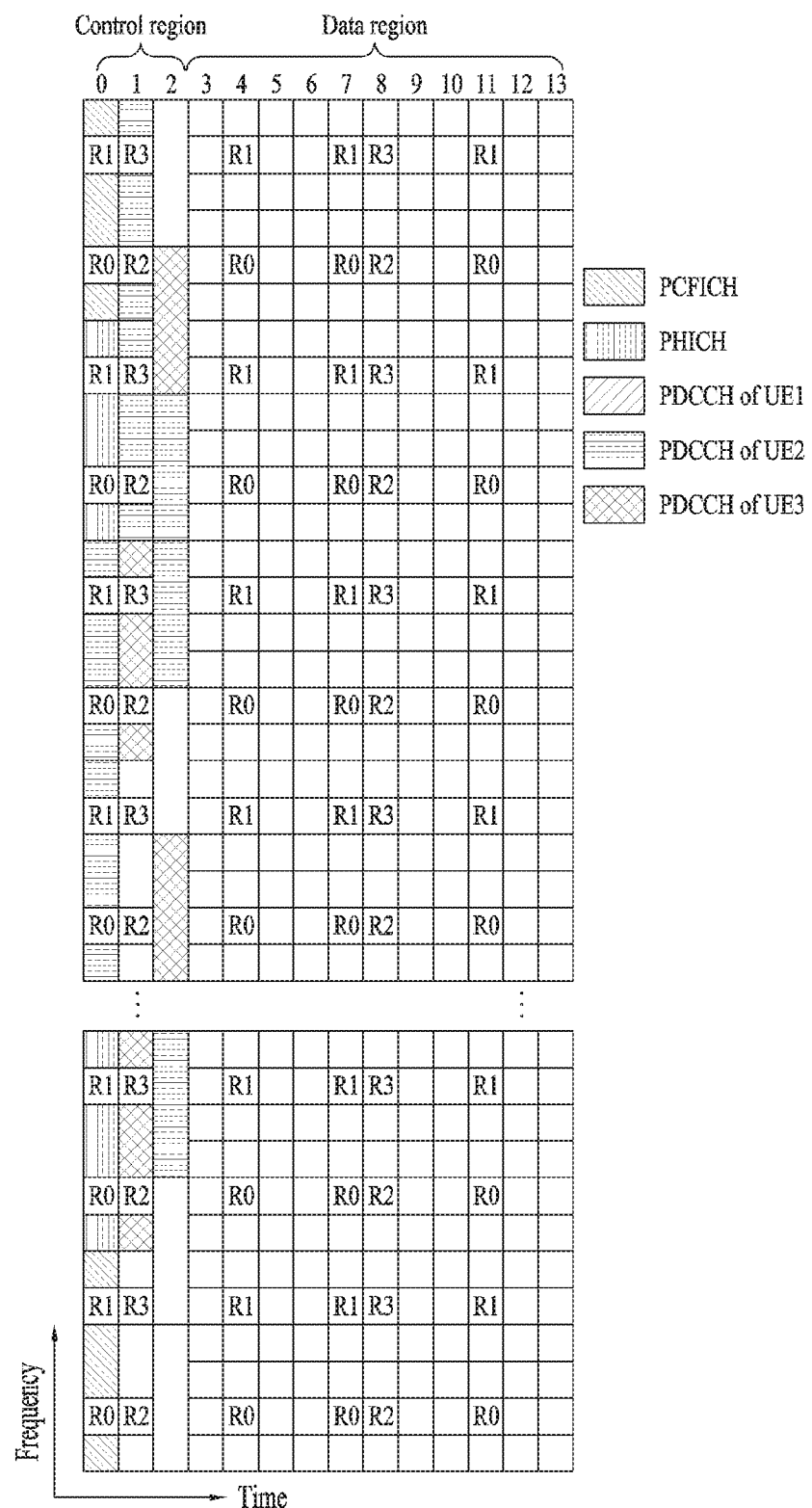
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
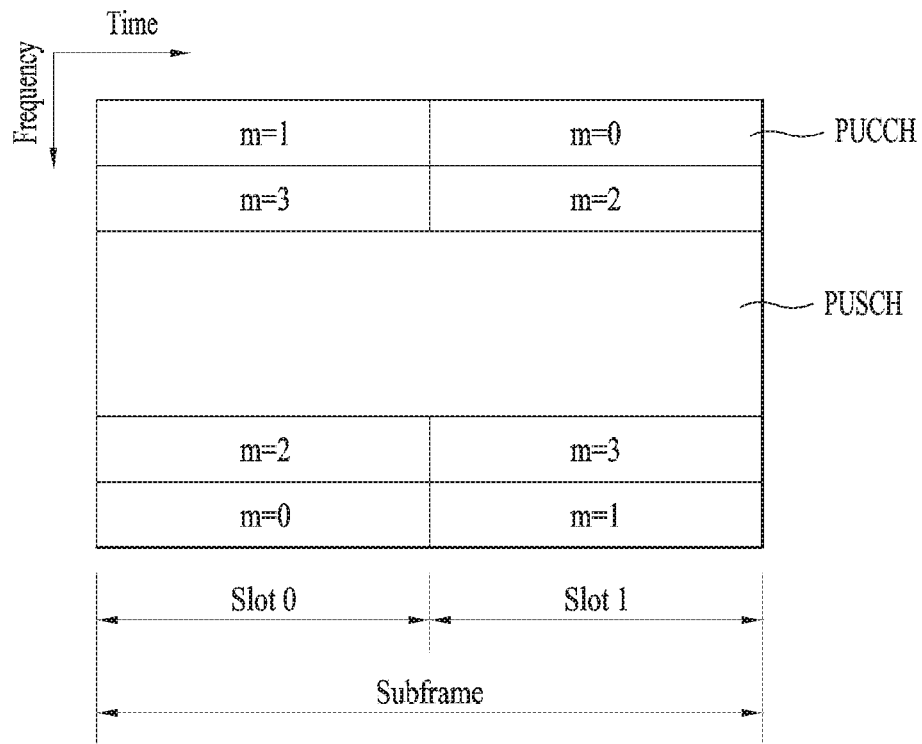
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a MIMO system will be described. MIMO refers to a method of using multiple transmission antennas and multiple reception antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 7:
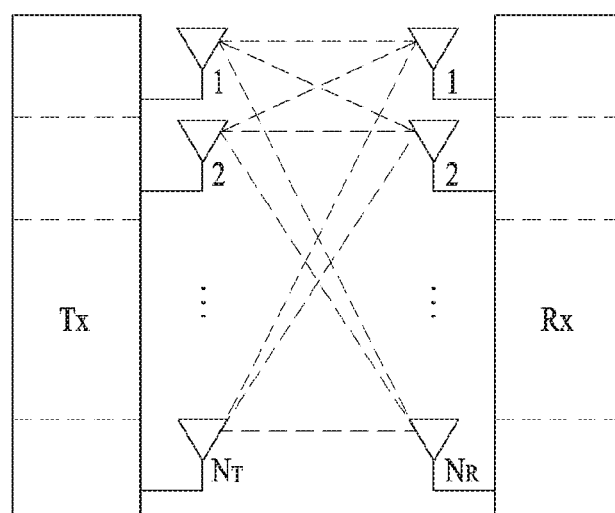
FIG. 7 is an exemplary view illustrating the configuration of a general multiple input multiple output (MIMO) communication system.

The configuration of a general MIMO communication system is shown in FIG. 7.

A transmitting end is equipped with $N_T$ transmission (Tx) antennas and a receiving end is equipped with $N_R$ reception (Rx) antennas. If a plurality of antennas is used both at the transmitting end and at the receiving end, theoretical channel transmission capacity increases unlike the case where only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in the capacity of the MIMO system was first demonstrated in the mid-1990s, various techniques for substantially improving data transfer rate have been under development. Several of these techniques have already been incorporated into a variety of wireless communication standards including, for example, 3rd generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 7, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2:

$$s = [s_1, s_2, \ldots, s_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s}=[\hat{s}_1,\hat{s}_2,\ldots,\hat{s}_{N_T}]=[P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of a transmission power:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ to be actually transmitted may be configured by multiplying the transmission power-controlled information vector ŝ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{22} & \cdots & w_{1N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7:

$$\text{\# of streams rank}(H) \leq \min(N_T, N_R) \quad \text{[Equation 7]}$$

where '# of streams' denotes the number of streams. It should be noted that one stream may be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid of spatial diversity and spatial multiplexing.

Now, a description of a Channel status information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(j) \begin{bmatrix} X_i & 0 \\ 0 & X_i \end{bmatrix}, \quad \text{[Equation 9]}$$

where $X_i$ is $Nt/2$ by $M$ matrix.

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\,columns}$$

(if rank = r), where $1 \leq k, l, m \leq M$ and $k, l, m$ are integer.

Herein, NT represents the number of transmission antennas, and M represents the number of columns in a matrix Xi, indicating that the matrix Xi has a total of M candidate column vectors. $e_M^k$, $e_M^l$ and $e_M^m$ represent $k^{th}$, $l^{th}$, and $m^{th}$ column vectors of Xi, in which $k^{th}$, $l^{th}$, and $m^{th}$ elements are 0 and the remaining elements are 1, respectively. $\alpha_j$, $\beta_j$, and $\gamma_j$ are complex values each having a unit norm, indicating that when $k^{th}$, $l^{th}$, and $m^{th}$ column vectors of the matrix Xi are selected, phase rotation is applied to these column vectors, respectively. i is an integer equal to or larger than 0, representing a PMI indicating W1, and j is an integer equal to or larger than 0, representing a PMI indicating W2.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i) * W2(j) = \begin{bmatrix} X_i(k) \\ \alpha_j X_i(k) \end{bmatrix} \qquad \text{[Equation 10]}$$

In Equation 10, a codeword is expressed as an $N_T \times 1$ vector where NT is the number of Tx antennas and the codeword is composed of an upper vector $X^{(k)}$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

As described before, CSI includes, but not limited to, a CQI, a PMI, and an RI, and all or a part of the CQI, the PMI, and the RI are transmitted according to the transmission mode of each UE in the LTE system. Periodic CSI transmission is referred to as periodic CSI reporting, and CSI transmission upon request of an eNB is referred to as aperiodic CSI reporting.

In aperiodic CSI reporting, an eNB transmits a request bit included in UL scheduling information to a UE. The UE then transmits CSI based on its transmission mode to the eNB on a PUSCH.

In periodic CSI reporting, a period, an offset in the period, and so on are signaled semi-statically to each UE on a subframe basis by higher-layer signaling. The UE transmits CSI based on a transmission mode at a predetermined period on a PUCCH to the eNB. If UL data also exists in a subframe carrying the CSI, the CSI is transmitted together with the UL data on a PUSCH.

The eNB transmits, to each UE, transmission timing information suitable for the UE in consideration of the channel state of the UE and the distribution of UEs in a cell. The transmission timing information may include a period, an offset, and so on required for CSI transmission, and may be transmitted to the UE by an RRC message.

A description will be given below of coordinated multi-point (CoMP) transmission/reception.

The introduction of a technique of increasing system performance by enabling cooperation between a plurality of cells is intended for a beyond LTE-A system. The technique is called CoMP. In CoMP, two or more eNBs, access points (APs), or cells cooperate with each other for communication with a specific UE, in order to enable more reliable communication between the specific UE and the eNBs, APs, or cells. In the present invention, the terms eNB, AP, and cell are interchangeably used in the same meaning.

Generally in a multi-cellular environment with a frequency reuse factor of 1, the performance of a UE at a cell edge and an average sector throughput may be reduced in view of inter-cell interference (ICI). To reduce ICI, the legacy LTE system allows a UE located at a cell edge to have an appropriate throughput performance in an interference-constrained environment by adopting a simple passive technique such as factional frequency reuse (FER) based on UE-specific power control. However, it may be more preferable to reduce ICI or reuse ICI as a desired signal for a UE than to reduce per-cell frequency resource use. To this end, a CoMP transmission scheme may be used.

Figure 8:
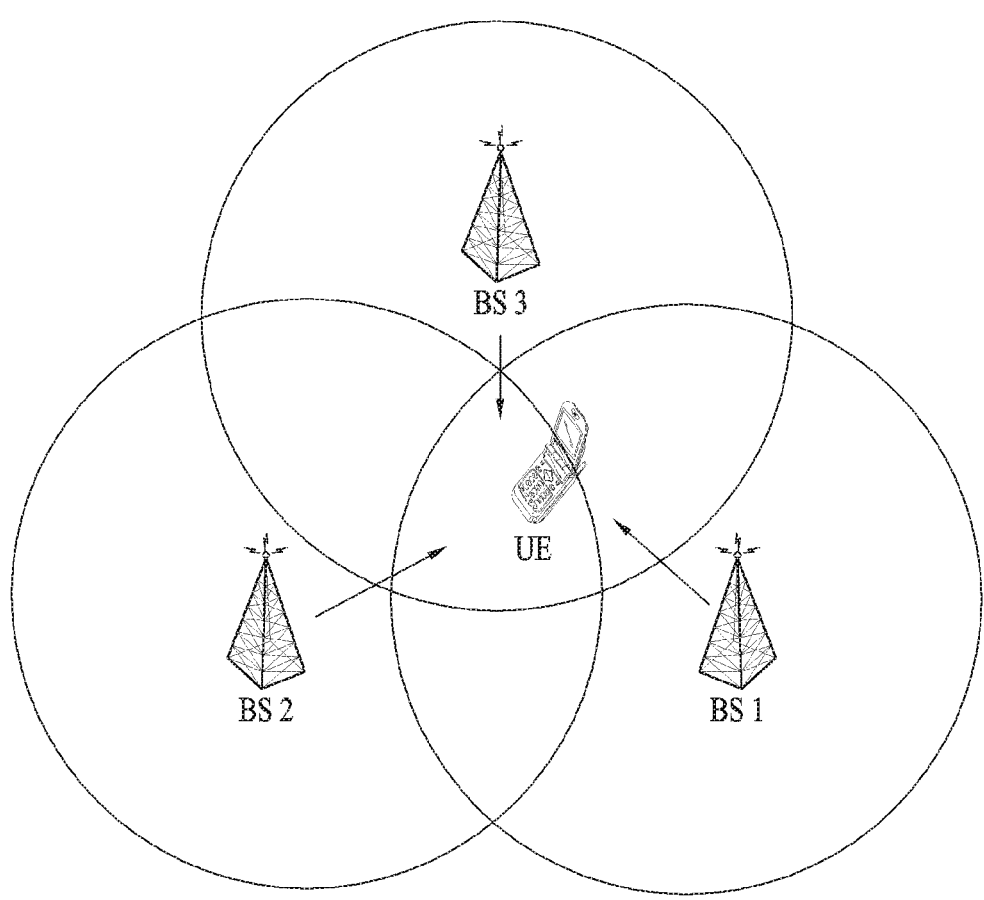
FIG. 8 is an exemplary view illustrating coordinated multi-point (CoMP) implementation.

FIG. 8 illustrates an example of carrying out CoPM. Referring to FIG. 8, a wireless communication system includes a plurality of BSs that perform CoMP, BS1, BS2 and BS3, and a UE. The plurality of BSs that perform CoMP, BS1, BS2 and BS3 may efficiently transmit data to the UE by cooperating with each other.

CoMP transmission schemes may be classified into CoMP-joint processing (CoMP-JP) called cooperative MIMO characterized by data sharing, and CoMP-coordinated scheduling/beamforming (CoMP-CS/CB).

In DL CoMP-JP, a UE may receive data simultaneously from BSs that perform CoMP transmission, and combine the received signals, thereby increasing reception performance (joint transmission (JT)). In addition, one of the BSs participating in the CoMP transmission may transmit data to the UE at a specific time point (dynamic point selection (DPS)). In CoMP-CS/CB, a UE may receive data instantaneously from one BS, that is, a serving BS by beamforming.

In UL CoMP-JP, a plurality of BSs may receive a PUSCH signal from a UE at the same time (joint reception (JR)). In contrast, in UL CoMP-CS/CB, only one BS may receive a PUSCH from a UE. Herein, cooperative cells (or BSs) may make a decision as to whether to use CoMP-CS/CB.

A UE adopting a CoMP transmission scheme, that is, a CoMP UE may feed back channel information (referred to as a CSI feedback) to a plurality of BSs that perform the CoMP transmission scheme. A network scheduler may select an appropriate CoMP transmission scheme that increases a transmission rate from among CoMP-JP, CoMP-CS/CB, and DPS on the basis of the CSI feedback. For this purpose, the CoMP UE may follow a PUCCH-based periodic feedback transmission scheme by configuring CSI feedbacks for the plurality of BSs performing the CoMP transmission scheme. In this case, feedback configurations for the respective BSs may be independent of each other. Accordingly, each operation of feeding back channel information with such an independent feedback configuration will be referred to as a CSI process in the disclosure according to an embodiment of the present invention. One or more CSI processes may exist in one serving cell.

Figure 9:
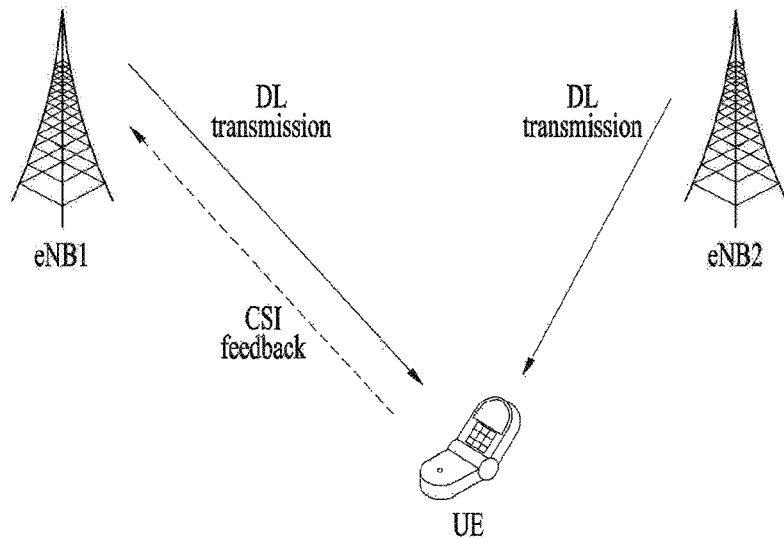
FIG. 9 is a view illustrating a downlink CoMP operation.

FIG. 9 illustrates a DL CoMP operation.

In FIG. 9, a UE is located between two eNBs, eNB1 and eNB2. The two eNBs (i.e., eNB1 and eNB2) perform an appropriate CoMP operation such as JT, DCS, or CS/CB in order to cancel interference to the UE. The UE transmits an appropriate CSI feedback to assist the eNBs in the CoMP operation. Information transmitted by the CSI feedback may include PMI information and CQI information for each eNB, and may further include channel information between the two eNBs (e.g., phase offset information between channels of the two eNBs), for JT.

In FIG. 9, although the UE transmits a CSI feedback signal to its serving cell, eNB1, the UE may transmit a CSI feedback signal to eNB2 or both of the eNBs, when needed. Further, while a basic unit participating in CoMP is shown in FIG. 9 as an eNB, the present invention is also applicable to CoMP between transmission points (TPs) controlled by a single eNB.

That is, to enable the network to perform CoMP scheduling, the UE should feedback DL CSI for a neighbor eNB/TP participating in CoMP as well as DL CSI for the serving eNB/TP. For this purpose, the UE transmits feedbacks for a plurality of CSI processes which reflect various data transmitting eNBs/TPs and various interference environments.

Therefore, an interference measurement resource (IMR) is used to measure interference for use in calculating CoMP CSI in the LTE system. A plurality of IMRs may be configured for one UE, and the UE has an independent configuration for each of the IMRs. That is, a period, an offset, and a resource configuration are independently configured for each IMR, and the eNB may signal the independent configuration for each IMR to the UE by higher-layer signaling (RRC signaling or the like).

In addition, the LTE system uses a CSI-RS to measure a desired channel, which is required for calculating CoMP CSI. A plurality of CSI-RSs may be configured for one UE, and each of the CSI-RSs may have an independent configuration. That is, a period, an offset, a resource configuration, power control (PC), and the number of antenna ports may be configured independently for each CSI-RS, and the eNB signals information related to the CSI-RS to the UE by higher-layer signaling (RRC signaling or the like).

One CSI process may be configured for a UE by associating one CSI-RS for signal measurement with one IMR for interference measurement from among a plurality of CSI-RSs and a plurality of IMRs configured for the UE. The UE feeds back CSI derived from different CSI processes with independent periods and subframe offsets to the network (e.g., an eNB).

That is, each CSI process has an independent CSI feedback configuration. The eNB may indicate a per-CSI process CSI-RS resource, IMR, and CSI feedback configuration to the UE by higher-layer signaling such as RRC signaling or the like. For example, it is assumed that three CSI processes as listed in Table 1 are configured for the UE.

TABLE 1

| CSI Process | Signal Measurement Resource (SMR) | IMR |
| --- | --- | --- |
| CSI Process 0 | CSI-RS 0 | IMR 0 |
| CSI Process 1 | CSI-RS 1 | IMR 1 |
| CSI Process 2 | CSI-RS 0 | IMR 2 |

In [Table 1], CSI-RS 0 and CSI-RS 1 are respectively a CSI-RS received from the serving eNB of the UE, eNB1, and a CSI-RS received from a neighbor eNB participating in CoMP, eNB2. It is assumed that IMRs are configured for the CSI processes listed Table 1, as illustrated in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

It is configured that in IMR 0, eNB1 is mute, eNB2 transmits data, and the UE measures interference from the other eNBs except for eNB1. Similarly, it is configured that in IMR 1, eNB2 is mute, eNB1 transmits data, and the UE measures interference from the other eNBs except for eNB2. Further, it is configured that in IMR 2, both of eNB1 and eNB2 are mute, and the UE measures interference from the other eNBs except for eNB1 and eNB2.

Therefore, as noted from Table 1 and Table 2, CSI of CSI process 0 represents best RI, PMI, and CQI information, in the case where the UE receives data from eNB1. CSI of CSI process 1 represents best RI, PMI, and CQI information, in the case where the UE receives data from eNB2. CSI of CSI process 2 represents best RI, PMI, and CQI information, in the case where the UE receives data from eNB1 without any interference from eNB2.

The introduction of an active antenna system (AAS) is a recent active research area for future-generation mobile communication. As each antenna is configured as an active antenna having an active circuit in the AAS, the AAS is a technology that may be applied more efficiently for interference reduction or beamforming by changing an antenna pattern adaptively according to a situation.

When the AAS is implemented two-dimensionally, that is, a two-dimensional AAS (2D-AAS) is realized, it is possible to change a transmission beam more actively according to the location of a receiver by more efficiently controlling the main lobe of an antenna three-dimensionally in an antenna pattern.

Figure 10:
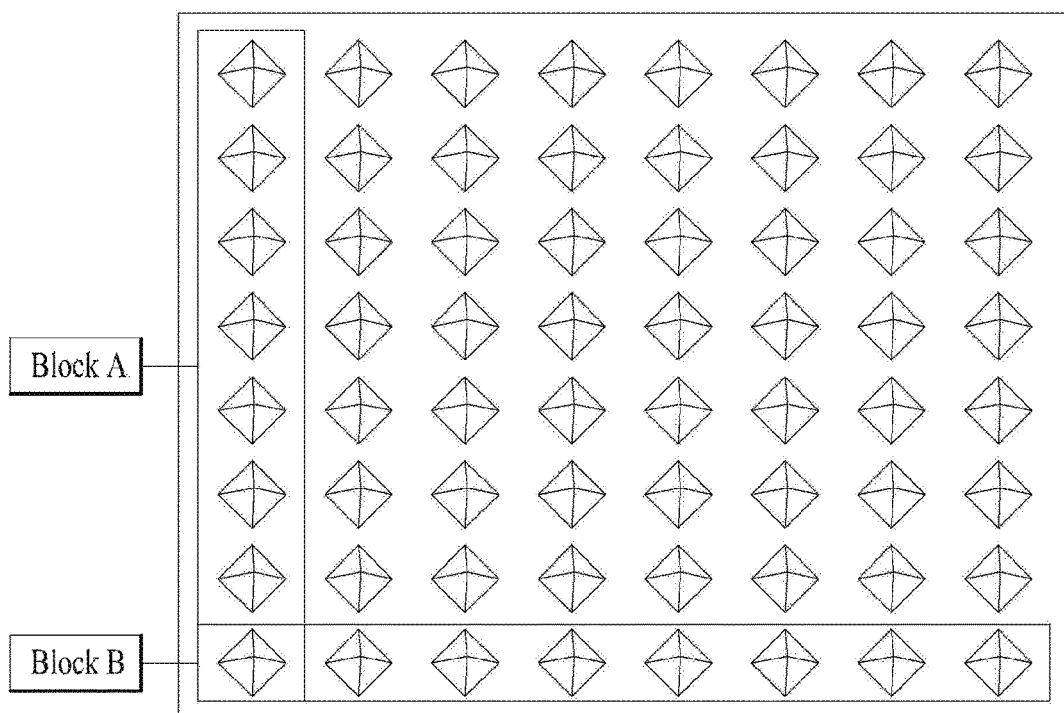
FIG. 10 is a view illustrating an implementation example of a two-dimensional active antenna system (2D-ASS)

FIG. 10 illustrates an implementation example of the 2D-AAS. Particularly, FIG. 10 is based on the assumption of a co-polarized antenna array in which each antenna element has the same polarization. Referring to FIG. 10, as antennas are arranged vertically and horizontally in the 2D-AAS, it is expected that the 2D-AAS will be deployed as a large-scale antenna system.

In a full dimension-MIMO (FD-MIMO) system to which the 2D-AAS is applied, an eNB may configure a plurality of CSI-RS resources in one CSI process for a UE. A CSI process refers to an operation of feeding back channel information with an independent feedback configuration.

In this case, the UE assumes the CSI-RS resources configured in the single CSI process to be one huge CSI-RS resource by aggregating the CSI-RS resources, calculates CSI from the aggregate, and feeds back the calculated CSI. For example, the eNB configures three 4-port CSI-RS resources in one CSI process for the UE, and the UE assumes one 12-port CSI-RS resource by aggregating the three 4-port CSI-RS resources. The UE calculates CSI by using a 12-port PMI from the CSI-RS resource, and feeds back the CSI. This reporting mode is referred to as class A CSI reporting in the LTE-A system.

Or, the UE selects one of the CSI-RS resources, assuming that each of the CSI-RS resources is an independent channel, and calculates and reports CSI based on the selected resource. That is, the UE selects a CSI-RS having a strong channel from among the eight CSI-RSs, calculates CSI based on the selected CSI-RS, and reports the CSI to the eNB. The UE additionally reports the selected CSI-RS to the eNB by a CSI-RS resource indicator (CRI). For example, if the channel of a first CSI-RS corresponding to T(0) is strongest, the UE reports a CRI set to 0 (CRI=0) to the eNB. This reporting mode is referred to as class B CSI reporting in the LTE-A system.

To represent the above features more effectively, the following parameters may be defined for a CSI process in class B. K represents the number of CSI-RS resources in one CSI process, and $N_k$ represents the number of CSI-RS ports in a $k^{th}$ CSI-RS resource.

<Hybrid CSI>

Meanwhile, hybrid CSI has recently been introduced for the 3GPP standardization, in order to further improve the FD-MIMO system. With reference to the drawings, hybrid CSI will be described in detail.

Figure 11:
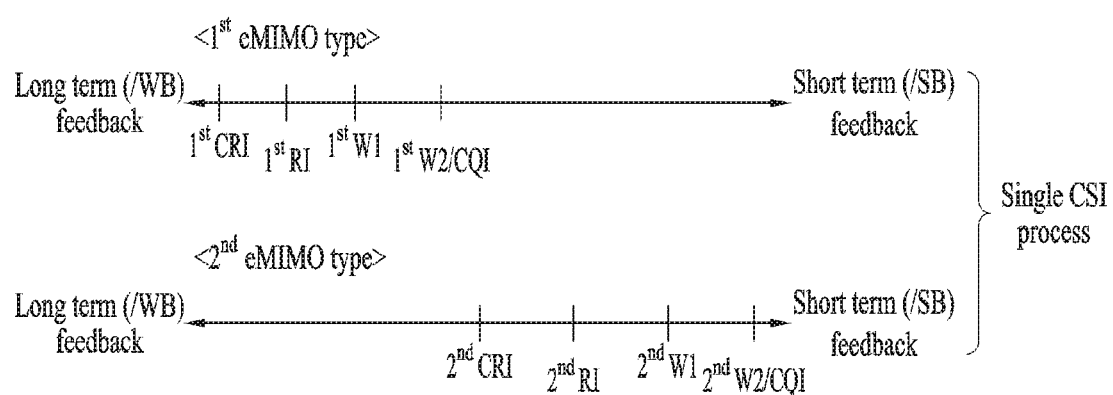
FIG. 11 is an exemplary view illustrating the concept of hybrid channel status information (CSI)

FIG. 11 is an exemplary view illustrating the concept of hybrid CSI.

Referring to FIG. 11, two enhanced MIMO (eMIMO) types are defined in a single CSI process. CSI is produced for each eMIMO type. CSI of the first eMIMO type is fed back over a longer term, or carries wideband (WB) CSI, compared to CSI of the second eMIMO type. That is, the eNB configures a single CSI process with the first eMIMO type and the second eMIMO type for the UE (i.e., the eNB transmits CSI process information to the UE by higher-layer signaling), and changes beamforming applied to a CSI-RS of the second eMIMO type, using CSI of the first eMIMO type received from the UE. The UE then reports CSI based on the CSI-RS of the second eMIMO type to the eNB.

In FIG. 11, CSI of the first eMIMO type and CSI of the second eMIMO type are defined respectively as first CSI (i.e., a first CRI, a first RI, first W1, first W2, and a first CQI) and second CSI (i.e., a second CRI, a second RI, second W1, second W2, and a second CQI).

Table 3 below illustrates exemplary operation mechanisms for hybrid CSI, reflected in the 3GPP standardization. Specifically, in hybrid CSI reporting mechanism 1, whether to transmit an RI is for further study (FFS), and W1 is reported in the first CSI. K, which represents the number of CSI-RSs defined in one class B CSI process, is 1. In the second CSI, therefore, a CRI is not reported, an RI, W2, and a CQI are reported, and whether to report W1 depends on a class B PMI configuration of the second eMIMO type, indicated by RRC signaling (i.e., if the PMI configuration is 0, W1 is reported, and if the PMI configuration is 1, W1 is not reported).

<Methods for Periodic Feedback of Hybrid CSI>

First, a new reporting type for a PUCCH hybrid CSI feedback, and a feedback period and offset for the new reporting type will be described.

For periodic CSI reporting on a PUCCH, reporting types, and a feedback period and offset for each reporting type should be newly introduced. As described before, as two eMIMO types are defined in a single CSI process, CSI of each eMIMO type should be reported periodically.

First of all, the period of first eMIMO-type CSI may be determined to be a multiple of a longest period of second eMIMO-type CSI. The longest period of CSI is the longest of the reporting periods of a CRI, an RI, a PMI, and a CQI. With transmission of a CRI, the longest period of the second eMIMO type-CSI is the period of the CRI, whereas without the CRI, the longest period of the second eMIMO-type CSI is the period of an RI. Obviously, if the RI is not transmitted, the longest period of the second eMIMO-type CSI is determined to be the period of a CQI. Or, the period of the first eMIMO-type CSI may always be set to a multiple of the period of the second eMIMO-type RI. Or, the period of the first eMIMO-type CSI may always be set to a multiple of the period of the second eMIMO-type CQI.

The multiple may be set to a value, including 1, which makes the period of the first eMIMO-type CSI equal to the longest period of the second eMIMO-type CSI. Or the multiple may be fixed only to 1 so that the period of the first eMIMO-type CSI is always equal to the longest period of the second eMIMO-type CSI. Or the multiple may be set not to 1 but to any value equal to or larger than 2 so that the period of the first eMIMO-type CSI is always longer than the longest period of the second eMIMO-type CSI.

An offset for the first eMIMO-type CSI, that is, a subframe offset linked to the period for the first eMIMO-type CSI may be limited to a value equal to an offset for the longest CSI of the second eMIMO type. In this case, the first CSI and the second CSI collide with each other in a specific subframe. One of methods of avoiding the collision is to report the first CSI and the second CSI in the event of collision, and define a new reporting type for the reporting. Another method is to prioritize the first CSI and the second CSI such that the first CSI always has a higher priority than the second CSI, and thus report the first CSI, while the second CSI is dropped. Similarly in the event of CSI collision between different two CSI processes, it is defined that the first CSI has a higher priority than the second CSI or legacy CSI of a legacy CSI process. Or, to overcome the collision by eNB implementation, different offset configu-

TABLE 3

|  | Type | First CRI | First RI | First W1 | Second W2/CQI | Second CRI | Second RI | Second W1 | Second W2 | Second CQI |
|---|---|---|---|---|---|---|---|---|---|---|
| Mechanism 1 | A + B w/ K = 1 | N.A. (Class A) | FFS | ○ | X | X (K = 1) | ○ | Depending on PMI config | ○ | ○ |
| Mechanism 2 | B + B w/ K = 1 | ○ (K > 1) | X | X | X | X (K = 1) | ○ | ○ | ○ | ○ |

Now, a description will be given of the present invention with reference to Table 3 and FIG. 11. It is to be noted that Table 3 and FIG. 11 are merely exemplary for the convenience of description, and the spirit of the present invention is also applicable to any modification to the hybrid CSI reporting mechanisms.

rations may be enabled by signaling an offset of the first eMIMO-type CSI separately from an offset of the second eMIMO-type CSI.

Further, the offset of the first eMIMO-type CSI is calculated based on the offset of the longest period of the second eMIMO-type CSI (e.g., the period of the RI), and the offset of the first eMIMO-type CSI is limited to a multiple of 5 which is the minimum of $N_{pd}$ values. As a consequence, a reporting time of the first eMIMO-type CSI is apart from a reporting time of the second eMIMO-type CSI by at least 5 ms, so that the UE secures a long time enough to calculate each of the first eMIMO-type CSI and the second eMIMO-type CSI, that is, 5 ms or longer. Or for the same purpose, the constraint may be imposed that the offset of the first eMIMO-type CSI is set to at least 5 ms. Or the constraint may be imposed that the offset of the first eMIMO-type CSI is set to at least N ms, where N may be RRC-signaled to the UE by the eNB.

If the offset of the first eMIMO-type CSI is limited to a value equal to the offset of the longest period of the second eMIMO-type CSI, the first eMIMO-type CSI should have a period at least longer than the longest period of the second eMIMO-type CSI. This is because if the same period is set for the two pieces of CSI, the two pieces of CSI always collide with each other, thereby resulting in dropping of the longest CSI of the second eMIMO type all the time. To avert the problem, the period of the first CSI should be set to a value equal to or longer than a double of the longest period of the second eMIMO-type CSI.

The following description is given on the assumption that offsets from the same reference subframe are set for the two pieces of CSI (i.e., the first CSI and the CSI with the longest period in the second CSI). Therefore, the same offset for the two pieces of CSI means that if the period of one CSI is set to N, and the period of the other CSI is set to N*K, the CSI having the period of N always collides with the CSI having the period of N*K. If an offset for one CSI is configured from a subframe in which the other CSI is reported, not from the same reference subframe as for the offset for the other CSI, this implies that if the offset is 0, the two pieces of CSI have the same offset. Therefore, if an offset for one CSI is configured from a subframe in which the other CSI is reported, this amounts to substantially setting the offset to 0.

Besides the scheme of reporting one of the first CSI and the second CSI, and dropping the other CSI in the event of collision between the first CSI and the second CSI, a scheme of reporting the first CSI and the second CSI together may also be considered, as described before. However, since a payload size may increase above the maximum capacity of PUCCH format 2, PUCCH format 2 may be switched to PUCCH format 3. For example, if the first W1 (or the first W1 and the first RI) collides with the second CRI (or the second RI), the UE uses PUCCH format 3 to report the first W1 and the second CRI (or the second RI) together.

Or the period and offset of the first eMIMO-type CSI may be signaled separately from those of the second eMIMO-type CSI, and the first CSI may be configured to be transmitted over a long term, compared to the second CSI, by eNB implementation. That is, the period and offset of the first eMIMO-type CSI and the period and offset of the first eMIMO-type CSI (the second eMIMO-type CSI?) are signaled separately, and a period and an offset are configured for each eMIMO type in a legacy period and offset configuration method. Notably, in order to prevent the offset of the first eMIMO-type CSI from being equal to the offset of the longest CSI of the second eMIMO type, the same offset may be excluded from available values to be signaled.

If a plurality of pieces of CSI of the first eMIMO type are defined (i.e., if the UE reports two or more of the first CRI, RI, PMI, and CQI), the plurality of pieces of CSI of the first eMIMO type may be limited to the same period. That is, the first CRI, RI, PMI, and CQI have equal periods. However, different offsets may be configured for the first CRI, RI, PMI, and CQI in view of the limited capacity of the PUCCH, and as a result, the first CRI, RI, PMI, and CQI may be reported separately in different subframes.

When a new PUCCH reporting type is introduced, the reporting type may include only the first CSI, or both of the first CSI and the second CSI. In the former case, a bit concatenation order identical or similar to a legacy bit concatenation order may be determined for the first CSI. That is, the most significant bit (MSB) is allocated in the order of CRI, RI, W1, W2, and CQI. For example, first CRI+first W1 or first CRI+first W2 may be introduced as a new reporting type, and the CRI and W1 are bit-concatenated with the CRI occupying the MSB and W1 occupying the least significant bit (LSB). Herein, the UE does not report the first RI, and always assumes the first RI to be 1.

In the latter case, that is, if the first CSI and the second CSI form one reporting type, a new bit concatenation order may be applied, instead of the legacy bit concatenation order for CSI. For example, if the first W1 (or the first W2) and the second CRI or the second RI are reported together, the first W1 (or the first W2) may first be allocated to the MSB. This operation is intended to increase reliability by applying more robust coding to the first PMI/CQI because the first PMI/CQI is more important than the second CRI/RI and has the long-term/WB property in hybrid CSI reporting. Then, the generalization may be made that the first CSI (i.e., the first CRI, RI, W1, W2, or CQI) is allocated to the MSB with priority over the second CSI (i.e., the second CRI, RI, W1, W2, or CQI).

The afore-described method of configuring a period and offset for first CSI will be described in the context of the foregoing mechanisms, by way of example. A method proposed in each mechanism is also applicable in the same manner to other mechanisms. The eNB configures one of the mechanisms for the UE by RRC signaling, and the UE reports CSI according to the configured mechanism. As a mechanism configuration is defined in each CSI process, it is possible to report CSI in a different mechanism for each CSI process. However, the first eMIMO type and the second eMIMO type may share one resource for an IMR, thereby minimizing resource waste.

Mechanism 1

As described above, the first W1 has a period set to a multiple of the period of the second RI, and an offset equal to the offset of the second RI. The multiple may be indicated by reusing signaling used for setting the period of the legacy CRI. That is, conventionally, a CRI has a period set to a multiple of the period of an RI, and an offset equal to the offset of the RI, and signaling used for configuring the CRI period is reused in the same manner for configuring the period of the first W1. Or a reserved state of the signaling used in configuring the period of the legacy CRI may be newly defined so as to set the period of the first W1 to a multiple of the period of the second RI. This may be extended to the generalization that the signaling used for configuring the period of the legacy CRI is reused to configure the period of the first CSI. Or the reserved state of the signaling used for configuring the period of the legacy CRI may be redefined.

For reference, tables used in configuring the period and offset of the legacy CRI are cited as Table 4 and Table 5. Table 4 lists CRI periods which are configured when an RI is transmitted, and Table 5 lists CRI periods and offsets which are configured when an RI is not transmitted. If a CRI and an RI are not transmitted in the second eMIMO type, the period and offset of the first CSI may be determined based on the period and offset (i.e., $N_{pd}$) of a CQI by reusing signaling illustrated in Table 5.

TABLE 4

| $I_{CRI}$ | Value of $M_{CRI}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 7 < $I_{CRI}$ ≤ 1023 | Reserved |

TABLE 5

| $I_{CRI}$ | Value of $M_{CRI}$ | Value of $N_{OFFSET, CRI}$ |
|---|---|---|
| 0 ≤ $I_{CRI}$ ≤ 160 | 1 | $-I_{CRI}$ |
| 161 ≤ $I_{CRI}$ ≤ 321 | 2 | $-(I_{CRI} - 161)$ |
| 322 ≤ $I_{CRI}$ ≤ 482 | 4 | $-(I_{CRI} - 322)$ |
| 483 ≤ $I_{CRI}$ ≤ 643 | 8 | $-(I_{CRI} - 483)$ |
| 644 ≤ $I_{CRI}$ ≤ 804 | 16 | $-(I_{CRI} - 644)$ |
| 805 ≤ $I_{CRI}$ ≤ 965 | 32 | $-(I_{CRI} - 805)$ |
| 966 ≤ $I_{CRI}$ ≤ 1023 | | Reserved |

In this case, collision may occur between a report of the first W1 and a report of the second RI. To avoid the collision, a new reporting type may be defined to report the first W1 and the second RI together. However, since the new reporting type suffers from low resolution of W1 due to the limited capacity of PUCCH format 2 (i.e., due to low-precision caused by sub-sampling of a W1 codebook), the new reporting type may not be favorable. Although it is obvious that the transmission capacity problem may be solved by using PUCCH format 3, it may be regulated that the first W1 is reported, while the second RI is dropped. Or the period of the first W1 is set to a multiple of the period of the second RI, whereas the offset of the first W1 is signaled separately from the offset of the second eMIMO type (i.e., the offset of the second RI), thereby enabling configuration of different offsets for the first W1 and the second eMIMO type (i.e., the second RI). Or it may be configured that the period and offset of the first W1 are signaled separately from those of the second CSI.

If the first RI is additionally reported, it may be configured that the first RI is transmitted together with the first W1. Or although the first RI is reported with the same period as that of the first W1, different offsets are assigned to the first RI and the first W1 so that the first RI and the first W1 are transmitted in different subframes. Herein, the RI should be transmitted earlier than W1 by setting the offset of the RI to be smaller than the offset of W1. Or the first RI and the first W1 are transmitted in different subframes by setting the period of the first RI to a multiple of the period of the first W1, and assigning different offsets to the first RI and the first W1.

In the case where although the first RI is reported with the same period as that of the first W1, different offsets are assigned to the first RI and the first W1 so that the first RI and the first W1 are transmitted in different subframes, the eNB configures an offset only for one of the first RI and the first W1 for the UE, and an offset for the other is always fixed to a value obtained by adding (or subtracting) a predetermined value to (or from) the signaled offset. For example, if the offset of the first RI is signaled to the UE, the offset of the first W1 is always set to a value calculated by adding 1 to the offset of the first RI. This method may reduce signaling overhead. Likewise, this offset configuration method is also applicable to other mechanisms, when the first CSI includes multiple types of CSI (RI, PMI, CQI, CRI, etc.).

If the first RI is not reported, the UE and the eNB always assume that the rank of the first W1 is 1. Or the eNB indicates the first RI for use in calculating the first W1 to the UE by RRC signaling or the like, and the UE calculates the first W1 based on the first RI. Or while the RI is not reported for the convenience of period configuration in PUCCH CSI transmission, the RI may also be reported in PUSCH CSI transmission.

Mechanism 2

In mechanism 2, if K>1 in the first eMIMO type, the first CSI may include only the first CRI, or include the first RI, PMI, and CQI. If K=1 in the first eMIMO type, various implementation examples are available, and the UE reports the first W1, the first W2, or the first RI and the first PMI/CQI.

When the first CRI is reported, the first CRI has a period set to a multiple of the period of the second RI, and an offset equal to the offset of the second RI. The multiple may be indicated by reusing the signaling used for configuring a period of the legacy CRI. That is, conventionally, a CRI has a period set to a multiple of the period of an RI, and an offset equal to the offset of the RI, and signaling used for configuring the CRI period is reused in the same manner for configuring the period of the first CRI. Or a reserved state of the signaling used in configuring the period of the legacy CRI may be newly defined so as to set the period of the first CRI to a multiple of the period of the second RI. If a CRI and an RI are not transmitted in the second eMIMO type, the period and offset of the first CRI may be determined based on the period and offset (i.e., $N_{pd}$) of a CQI by reusing signaling illustrated in Table 5.

In this case, when the first CRI is reported, a report of the first CRI always collides with a report of the second RI. To avoid the collision, the UE defines and reports the first CRI and the second RI together in one reporting type (or in this case, it may be regulated that the first CRI is reported, while the second RI is dropped). Or while the period of the first CRI is set to a multiple of the period of the second RI, the offset of the first CRI may be signaled separately from the offset of the second eMIMO type (i.e., the offset of the second RI), thereby enabling configuration of different offsets. Or the period and offset of the first CRI are signaled and configured separately from those of the second CSI.

When the first RI, PMI, or CQI is reported, the UE configures the period and offset of the first CSI by receiving signaling separately from the period and offset of the second CSI from the eNB. Herein, the period and offset of the first CSI are configured in the same manner as the period and offset of CSI for a legacy non-hybrid CSI-RS. Or the first RI, PMI, and CQI have the same period, which is set to a multiple of the period of the second RI. As described before, the eNB may indicate the multiple to the UE by reusing the signaling used for configuring the period of the legacy CRI. However, different offsets may be assigned to the first RI, PMI, and CQI in consideration of the limited capacity of a PUCCH, and as a result, the first RI, PMI, and CQI may be reported separately in different subframes.

The method of configuring the period and offset of first W1 (particularly, the method described in mechanism 1) as proposed in the present disclosure may be used in the same manner for a method of configuring the period and offset of first CSI (e.g., first W2) other than the first W1. For example, if the first W2 is transmitted in mechanism 2, the proposed method of configuring the period and offset of first W1 may be used as a method of configuring the period and offset of first W2.

If the first RI is additionally reported, it may be configured that the first RI is transmitted together with the first W1. Or although the first RI is reported with the same period as that of the first W1, a different offset is assigned to the first RI so that the first RI and the first W1 are transmitted in different subframes. Herein, the RI should be transmitted earlier than W1 by setting the offset of the RI to be smaller than the offset of W1. Or the first RI and the first W1 are transmitted in different subframes by setting the period of the first RI to a multiple of the period of the first W1, and assigning different offsets to the first RI and the first W1.

<Solution to Collision of Hybrid CSI>

The following proposal is about a method of prioritizing CSI. In the event of collision between CSI, if the CSI has equal priorities, the CSI is prioritized by using CSI process indexes and component carrier (CC) indexes in a conventional manner.

Compared to the second CSI, the first CSI is defined as long-term CSI, and affects configuration of a second eMIMO-type CSI-RS and determination of the second CSI. Therefore, since upon occurrence of collision, the UE reports CSI with a high priority, while dropping CSI with a low priority, the first CSI should have a higher priority than the second CSI. The prioritization is applied when collision occurs between the first CSI and the second CSI in the same CSI process, and also when collision occurs between the first CSI and the second CSI in different CSI processes/CCs.

In another method, different prioritizations may be applied to collision between the first CSI and the second CSI in the same CSI process and collision between the first CSI and the second CSI in different CSI processes/CCs.

First of all, when collision occurs between the first CSI and the second CSI in the same CSI process, the first CSI has a higher priority than the second CSI. In this case, since too much priority may be given to the first CSI, the first CSI and the second CSI may be prioritized in a legacy prioritization rule. That is, the CSI is prioritized in the order of CRI>RI>PMI (or CQI). As a consequence, the second CRI has a higher priority than the first RI. However, in the event of collision between CSI with the same priority such as the first CRI and the second CRI, the first CSI has a higher priority than the second CSI.

Upon occurrence of collision between CSI in different CSI processes/CCs, the legacy prioritization rule is applied irrespective of the first CSI, the second CSI, or the legacy non-hybrid CSI. Or upon occurrence of collision between CSI in different CSI processes/CCs, the rule of prioritizing first CSI and second CSI as proposed by the present invention is applied only to collision between the first CSI and the second CSI, while the same prioritization rule is applied to all of the other cases (e.g., collision between the first CSI and the legacy non-hybrid CSI (or the legacy CSI), collision between the second CSI and the legacy CSI, collision between the second CSI and the second CSI, and collision between the first CSI and the first CSI) irrespective of the first CSI, the second CSI, or the legacy non-hybrid CSI.

Or a highest priority is assigned only to part of the first CSI, which is considered to be important, while the remaining first CSI is prioritized in the same manner as the legacy CSI. For example, considering that the first eMIMO type mainly functions to indicate the direction of a channel, the PMI (W1 or W2), the PMI and RI, or the CRI in the first CSI is considered to be important. Therefore, a higher priority is assigned to the first PMI (the first W1 or the first W2), the first PMI and the first RI, or the first CRI than the legacy CSI and the second CSI, while an existing priority is applied to the remaining CSI (e.g., the first CQI).

Or the priority of the first CSI is set to be equal to that of the legacy CRI, and the second CSI is prioritized in the same manner as the legacy CSI (i.e., the priority of the legacy CSI is the priority of CSI for a non-hybrid CSI-RS). The legacy CRI is reported with a highest priority in the legacy CSI, and the priority of the first CSI is considered to be equal to that of the CRI. For example, upon occurrence of collision between the first W1 and the second RI, the first W1 is reported, while the RI is dropped.

Or upon occurrence of collision between the first CSI and the second CSI, the legacy prioritization is applied. However, only in the case of equal priorities, the first CSI may be reported, while the legacy CSI may be dropped. For example, upon occurrence of collision between W1 of the first CSI and the legacy second CRI, the second CRI is first reported according to the legacy prioritization, whereas upon occurrence of collision between the CRI of the first CSI and the CRI of the second CSI, the first CRI is reported.

Meanwhile, in the event of collision between the first CSI and the legacy non-hybrid CSI, priorities should be defined between the first CSI and the legacy non-hybrid CSI. In view of the long-term nature of the first CSI as described before, the first CSI preferably has a higher priority than the legacy CSI. For example, upon occurrence of collision between the first W1 and the legacy CRI, the first W1 is reported, while the legacy CRI is dropped.

Or the highest priority (i.e., a priority higher than that of the legacy CSI) is assigned only to part of the first CSI, which is considered to be important, while the remaining first CSI is prioritized in the same manner as the legacy CSI.

Or the priority of the first CSI is set to be equal to the priority of the legacy CRI. Or the priority equal to the priority of the legacy CRI is assigned only to part of the first CSI, which is considered to be important, while the remaining first CSI is prioritized in the same manner as the legacy CSI.

Or upon occurrence of collision between the first CSI and the legacy CSI, the legacy prioritization is applied. However, only if the first CSI and the legacy CSI have equal priorities, the first CSI may be reported, while the legacy CSI may be dropped. For example, while upon occurrence of collision between W1 of the first CSI and the CRI of the legacy CSI, the CRI is first reported according to the legacy prioritization, upon occurrence of collision between the CRI of the first CSI and the CRI of the legacy CSI, the first CRI is reported.

However, the legacy prioritization rule may still be applied between the second CSI and the non-hybrid CSI. Or it may be configured that the priority of the second CSI is always higher (or lower) than that of the non-hybrid CSI.

Additionally, upon occurrence of collision between the first CSI, the legacy prioritization may still be applied. For example, upon occurrence of collision between the first CRI and the first CQI, the first CRI is reported according to the legacy prioritization. Specifically, upon occurrence of collision between the first CSI of CSI process 1 and the first CSI of CSI process 2, the CSI has equal priorities. Thus, the CSI of a CSI process with a lower CSI process index or the CSI of a CC with a lower CC index is reported.

When the afore-described new reporting type is used, that is, the first CSI and the second CSI are reported in one subframe through one reporting type, the reporting type is prioritized to have the priority of the first CSI. That is, all reporting types including the first CSI follow the priority of the first CSI. Or the priority of a corresponding reporting type is determined to be the higher between the priorities of the first CSI and the second CSI.

Meanwhile, a new reporting type for the first CSI may be defined such that the first CSI has a higher priority than the second CSI, in the event of collision between the first CSI and the second CSI. For example, when the first W1 and the first RI are reported together, a reporting type for the first W1 and the first RI is defined as type 5' separately from the legacy reporting type of W1 and an RI, type 5. Type 5' is reported with a higher priority than the remaining reporting types corresponding to the second CSI or the legacy CSI (or type 5' has a priority equal to the priorities of legacy types 7, 8, 9 and 10 in which a CRI is reported). Likewise, when the first W1 is reported alone, a reporting type for the first W1 is defined as type 2a', separately from the legacy reporting type of W1, type 2a, and a higher priority is assigned to type 2a'. Similarly, when the first RI is reported alone, a reporting type for the first RI is defined as type 3', separately from the legacy reporting type of an RI, type 3, and a higher priority is assigned to type 3'. In this way, reporting of the first CSI may be defined as type x', referring to a legacy type, and type x' has a higher priority than the legacy types. The priority relationship between the legacy types x may be applied to priorities between types x'. For example, since upon occurrence of collision between type 5 and type 2a, type 5 has priority over type 2a, this priority relationship is still applied, and as a result, type 5a' has priority over type 2a' upon occurrence of collision between type 5' and type 2a'. Or type x' has a priority equal to the priorities of types 7, 8, 9, and 10 including a CRI among the legacy types.

<PUCCH Reporting Mode Configuring Method>

According to a conventional method, a wideband (WB)/subband (SB) reporting mode is determined by CQI report-PeriodicProcID defined in a CSI process, and a PMI reporting mode is determined by pmi-ri-Report of CQI reportBothProc defined in the CSI process. As a result, a total of four PUCCH reporting modes are defined according to combinations of WB/SB and the presence and absence of a PMI.

For hybrid CSI reporting, the WB/SB reporting mode of the second CSI is determined by CQI reportPeriodicProcID, while the WB reporting mode is always determined for the first CSI irrespective of this signaling. This is because it is preferred to fix the reporting mode of the first CSI to the WB reporting mode in view of the nature of the first CSI that the first CSI provides long-term/WB channel information, compared to the second CSI.

Or for hybrid CSI reporting, a common reporting mode for the first CSI and the second CSI may be determined by CQI reportPeriodicProcID. That is, if the WB reporting mode is configured by CQI reportPeriodicProcID, both the first CSI and the second CSI are reported in the WB reporting mode, and if the SB reporting mode is configured by CQI reportPeriodicProcID, both the first CSI and the second CSI are reported in the SB reporting mode.

In a TDD system, an eNB may measure information about the directions and strengths of total channels by SRS reception. When the eNB transmits a (beamformed) CSI-RS to a UE on the basis of the information, the UE reports an RI and a CQI on the basis of the CSI-RS. Considering this operation, the TDD system does not require the hybrid CSI-RS scheme as much as the FDD system. This is because while information about the directions of total channels is obtained through the first eMIMO type, and then a beamformed CSI-RS is transmitted in a corresponding direction for a certain time (i.e., until the next first CSI is reported) through the second eMIMO type in the hybrid CSI-RS scheme, an SRS takes over the role of the first CSI in the TDD system. Therefore, with only the FDD system targeted in hybrid CSI, the UE preferably calculates CSI, expecting or assuming that pmi-ri-Report is always enabled.

Obviously, if channel estimation is not carried out successfully from an SRS or much reciprocity is not available, hybrid CSI reporting may be adopted even in the TDD system. In this case, the UE may feed back the first RI/PMI so that the eNB may compensate a channel estimated by an SRS with the first RI/PMI, and may not report the second RI/PMI by disabling or not configuring pmi-ri-Report. Therefore, pmi-ri-Report is applied only to the second eMIMO type. Whether to report a PMI/RI of the first eMIMO type is determined according to a hybrid CSI mechanism. That is, RRC signaling of pmi-ri-Report is restricted to the second eMIMO type. If pmi-ri-Report is configured by RRC signaling, the PMI and RI of the second eMIMO type are reported, and otherwise, the PMI and RI of the second eMIMO type are not reported.

Meanwhile, in the case where the first eMIMO type is configured as class A and the second eMIMO type is configured as class B in one CSI process, if PUCCH feedback mode 2-1 is configured for the CSI process, sub-mode 2 does not exist for class A. Thus, CSI is fed back by applying sub-mode 2 only to class B, and applying sub-mode 1 to class A. Additionally, if PUCCH feedback mode 2-1 is configured, the UE transmits a report with a PTI always set to 0 in the first eMIMO type. That is, the UE reports WB CSI. This serves the original purpose of hybrid CSI to provide long-term/WB information by a CSI feedback of the first eMIMO type, and reporting short-term/SB information by a CSI feedback of the second eMIMO type.

<Hybrid CSI Calculation Method>

Now, a description will be given of a hybrid CSI calculation method, particularly a method of calculating second CSI in the absence of recently reported first CSI.

According to a legacy operation, when a UE calculates CSI, a CRI affects calculation of the other CSI, that is, an RI, a PMI, and a CQI, the RI affects calculation of the PMI and the CQI, and the PMI affects calculation of the CQI. That is, there is a hierarchical structure between CSI, and higher-layer CSI (e.g., CRI) affects calculation of lower-layer CSI (e.g., RI, PMI, and CQI). As a consequence, the UE calculates lower-layer CSI on the assumption of a specific value of higher-layer CSI. If the higher-layer CSI is not reported as is the case with collision-incurred dropping, the UE calculates the lower-layer CSI on the assumption of a specific value of the higher-layer CSI (e.g., the lowest of indexes or values of CSI).

For the hybrid CSI-RS, the same scheme is applied between the first CSI (i.e., first RI, PMI, CQI, and CRI), and between the second CSI. However, whether this hierarchical structure exists between the first CSI and the second CSI, and whether one piece of CSI affects calculation of the other pieces of CSI may vary according to how hybrid CSI is operated, that is, hybrid CSI mechanisms. Additionally, although upon receipt of first CSI, the eNB changes a CSI-RS configuration of the second eMIMO type (e.g., a beam configuration applied to a beamformed CSI-RS), thereby eventually affecting second CSI, this operation is transparent to the UE and thus does not affect a CSI calculation operation of the UE. Hereinbelow, a hierarchical structure between CSI, and factors affecting CSI calculation will be described in the context of a CSI calculation operation of a UE.

The afore-described mechanism 1 may be considered as an exemplary operation method of hybrid CSI reporting in which first CSI does not affect calculation of second CSI (or vice versa). In mechanism 1, the UE reports a first PMI, and the eNB performs beamforming for a CSI-RS of the second eMIMO type by using the first PMI. Subsequently, the UE calculates second CSI by using the CSI-RS of the second eMIMO type. Herein, the UE calculates each of the first CSI and the second CSI according to a legacy CSI calculation method.

The afore-described mechanism 1 may be considered as an exemplary operation method of hybrid CSI reporting in which first CSI affects calculation of second CSI (or vice versa). In mechanism 1, the UE reports a first RI and a first PMI to the eNB, and the eNB performs beamforming for a CSI-RS of the second eMIMO type by using the first RI and the first PMI. Subsequently, the UE calculates second CSI by using the CSI-RS of the second eMIMO type. Herein, in the absence of a recently reported second RI when the UE calculates a second PMI/CQI, the UE calculates the second PMI/CQI based on a latest reported first RI. Similarly, in the absence of a first W1 when the UE calculates a second W2/CQI, the UE calculates the second W2/CQI based on the latest reported first W1.

Additionally, when the first eMIMO type and the second eMIMO type are divided into two CSI processes, the eNB may indicate linkage between the two CSI processes to the UE, and when calculating CSI of the second eMIMO type, the UE may use CSI of the first eMIMO type. For example, the linkage may be indicated by setting the index of the CSI process of the first eMIMO type in the CSI process of the second eMIMO type. Specifically, the second PMI, the second CQI, and the second RI may be calculated based on the latest reported first RI or first CRI.

One of methods of establishing a hierarchical structure between first CSI and second CSI is to determine the range of a second CQI by a first CQI (or to report a CQI offset based on the first CQI in a second CQI). That is, a modulation and coding scheme (MCS) table to be used in reporting the second CQI may be determined by the first CQI.

Meanwhile, when a first RI is additionally reported, the first RI may be configured to be transmitted together with first W1. Since the payload size of a class A codebook is significantly increased to about 10 bits, the first RI and the first W1 are preferably reported in PUCCH format 3. By extending this operation, it is proposed that all CSI of the first eMIMO type is transmitted at one time in PUCCH format 3. If CSI of the first eMIMO type includes an RI, a CQI, and a PMI, or a CQI, an RI, a CQI, and a PMI, the CSI of the first eMIMO type may be transmitted at one time in PUCCH format 3. Further, if all CSI of the first eMIMO type is transmitted at one time in PUCCH format 3, the CSI report in PUCCH format 3 has a higher priority than a CSI report in PUCCH format 2 in the event of collision between the CSI reports. Or this may be generalized into the statement that upon occurrence of collision between a reporting type in which CSI is transmitted in PUCCH format 3 and a reporting type in which CSI is transmitted in PUCCH format 2, PUCCH format 3 is preferably reported with priority.

Or upon occurrence of collision between first CSI reported in PUCCH format 3 and second CSI reported in PUCCH format, transmission of the second CSI together with the first CSI in PUCCH format 3 is preferred to dropping one of the first CSI and the second CSI and reporting the other CSI. However, only when PUCCH format 3 has a capacity enough to carry both of the first CSI and the second CSI, PUCCH format 3 carries both of the first CSI and the second CSI, and otherwise, only the first CSI is reported in PUCCH format 3.

Additionally, as both of the first CSI and the second CSI are transmitted together, the following new reporting types should be defined. For example, a reporting type for reporting a first W1 and a first RI together with various pieces of second CSI including a second RI is defined in hybrid mechanism 1. Typically, if the first CSI has a period which is a multiple of the period of the second RI, and an offset equal to the offset of the second RI (i.e., offset=0), the first CSI collides with the second RI, and thus the following new reporting types should be transmitted in PUCCH format 3.

Type 11=first RI+first W1+second RI
Type 12=first RI+first W1+second RI+second W1
Type 13=first RI+first W1+second RI+second PTI
Type 13'=first RI+first W1 (defined in case second RI is not defined, or second CSI does not collide with first CSI).
Type 14=first RI+first W1+second CRI
Type 15=first RI+first W1+second CRI+second RI
Type 16=first RI+first W1+second CRI+second RI+second W1
Type 17=first RI+first W1+second CRI+second RI+second PTI In hybrid CSI reporting mechanism 2, for example, the first CSI may be reported in two methods. In one of the methods, if it is defined that first CSI=first CRI, a reporting type for reporting first CRI together with various pieces of second CSI including a second RI is defined. Typically, if the first CSI has a period which is a multiple of the period of the second RI, and an offset equal to the offset of the second RI (i.e., offset=0), the first CSI collides with the second RI, and thus the following new reporting types should be transmitted in PUCCH format 3. Or considering that the payload sizes of a CRI and an RI are not large, PUCCH format 2 may be used in this case, as is done conventionally.

Type 18=first CRI+second RI
Type 19=first CRI+second RI+second W1
Type 20=first CRI+second RI+second PTI
Type 21=first CRI (defined in case second RI is not defined, or second CSI does not collide with first CSI)

Types 18 to 21 are similar to the legacy types 7, 8, 9, and 10, except that first CSI and second CSI are transmitted together in types 18 to 21. As types 7 to 10 and types 18 to 21 are defined separately, higher priorities may be assigned to types 18 to 21 than types 7 to 10.

In the other method, if it is defined that first CSI=first PMI, a reporting type for reporting first PMI together with various pieces of second CSI including a second RI is defined. Typically, if the first CSI has a period which is a multiple of the period of the second RI, and an offset equal to the offset of the second RI (i.e., offset=0), the first CSI collides with the second RI, and thus the following new reporting types should be transmitted in PUCCH format 3.

Type 18=first PMI for specific first CSI-RS+first PMI for another first CSI-RS+second RI
Type 19=first PMI for specific first CSI-RS+first PMI for another first CSI-RS+second RI+second W1
Type 20=first PMI for specific first CSI-RS+first PMI for another first CSI-RS+second RI+second PTI
Type 21=first PMI for specific first CSI-RS+first PMI for another first CSI-RS (defined in case second RI is not defined, or second CSI does not collide with first CSI)

In types 18 to 21, the specific first CSI-RS is the CSI-RS with the lower index between two CSI-RSs defined to be of the first eMIMO type, and another first CSI-RS is the CSI-RS with the higher index.

As various pieces of CSI are transmitted at one time through bit concatenation in the above types, there is a need for defining a bit concatenation order. First, MSBs are allocated to CSI in a described order in the above type definitions. For example, MSBs are allocated in the order of the first RI, the first W1, and the second RI in type 11.

As described above, although the first PMI for the specific first CSI-RS and the first PMI for the other first CSI-RS may be transmitted at the same time in PUCCH format 3, if PUCCH format 2 is used without introduction of PUCCH format 3, only one first PMI is transmitted in one subframe.

The period and offset of a first PMI report may be defined to be a multiple of the longest CSI period of the second CSI (e.g., the period of the second RI), and the same or different offset, respectively. The first PMI for the specific first CSI-RS and the first PMI for the other first CSI-RS are transmitted alternately at the time of each transmission subframe for the first PMIs.

That is, if first PMI transmission timings are set as subframe #n, subframe #n+10, subframe #n+20, subframe #n+30 . . . , the first PMI for the specific first CSI-RS is transmitted in subframe #n, subframe #n+20, subframe #n+40 . . . , and the first PMI for the other first CSI-RS is transmitted in subframe #n+10, subframe #n+30, subframe #n+50 . . . .

Or instead of alternate reporting between the first PMI for the specific first CSI-RS and the first PMI for the other first CSI-RS, the first PMI for the specific first CSI-RS and the first PMI for the other first CSI-RS may be configured to be transmitted with the same period and different offsets in different subframes Or in order to ensure as much scheduling freedom as possible, different periods and different offsets may be configured for the first PMI for the specific first CSI-RS and the first PMI for the other first CSI-RS.

Meanwhile, a CSI-RS may be selected by the first CRI, and reconfigured dynamically as a CSI-RS of the second eMIMO type. For example, in the case where two 4-port CSI RS and 8-port CSI-RS exist in the first eMIMO type, if the first CRI indicates the 4-port CSI-RS, the CSI-RS of the second eMIMO type is reconfigured as the 4-port CSI-RS, and if the first CRI indicates the 8-port CSI-RS, the CSI-RS of the second eMIMO type is reconfigured as the 8-port CSI-RS. However, if the CSI-RS of the second eMIMO type is reconfigured dynamically, additional signaling overhead is produced. The overhead may be minimized by the following proposed methods.

Proposal 1: the numbers of multiple ports of a first CSI-RS and a second CSI-RS, or PCs of the first CSI-RS and the second CSI-RS (i.e., values that determine power ratios between the CSI-RSs and a PDSCH) are limited to the same value. That is, the UE does not expect that different port numbers or PC values are configured for the first CSI-RS and the second CSI-RS.

According to proposal 1, there is no need for reconfiguring the number of ports or PC of the second CSI-RS irrespective of what CSI-RS is selected by a first CRI, thereby obviating the need for dynamic signaling. Even though different resource and subframe configurations are configured for the first and second CSI-RSs, a hybrid CSI operation is not affected, and thus the two parameters may be configured freely. However, proposal 1 suffers from lack of scheduling flexibility, and thus proposal 2 may be adopted to overcome the shortcoming.

Proposal 2: The number of ports of a second CSI-RS is set to the maximum number N of ports of a first CSI-RS. If a first CRI indicates a CSI-RS of fewer ports than N ports (e.g., K ports), the number of ports of the second CSI-RS is changed to K, and REs carrying a CSI-RS are determined to be a subset of REs of the N-port second CSI-RS without additional signaling. For example, since 8 REs of a second CRI-RS with N of 8 and K of 4 may be defined as two 4-port CSI-RSs, the CSI-RS with a lower subcarrier index between the two 4-port CSI-RSs is determined. In another example, if N is 8 and K is 2, 4 of 8 REs of the second CSI-RS may be defined as four 2-port CSI-RSs, and thus a CSI-RS with a low subcarrier index or a high subcarrier index may be determined from among four 2-port CSI-RSs.

Proposal 3: The UE overrides all or a part of the number of ports, Pc, or RE pattern of a second CSI-RS with the number of ports, Pc, or RE pattern of a first CSI-RS selected by a CRI. However, since the second CSI-RS should be transmitted with a shorter period than the first CSI-RS, the subframe configuration of the second CSI-RS is not overridden.

<Bit Concatenation Order for PUSCH CSI Feedback>

Meanwhile, as described before, if a first PMI for a specific first CSI-RS and a first PMI for another first CSI-RS are reported together, the specific first CSI-RS may be the CSI-RS with the lower index between two CSI-RSs defined to be of the first eMIMO type, and another first CSI-RS may be the CSI-RS with the higher index. Further, the first PMI for the specific first CSI-RS may first be allocated to MSBs, accompanied by allocation of the first PMI for the other first CSI-RS. Apparently, the opposite case is also possible.

<Method of Configuring P-CSI Subframe Period/Offset for P-CSI+AP-CSI>

Meanwhile, a scheme of reporting first CSI as periodic CSI (P-CSI) on a PUCCH and reporting second CSI as aperiodic CSI (AP-CSI) on a PUSCH are under consideration for the current 3GPP standardization. (On the contrary, a scheme of reporting second CSI as P-CSI on a PUCCH and reporting first CSI as AP-CSI on a PUSCH is also under consideration. Also in this case, the proposed methods of the present invention are applicable in the same manner).

As such, since only the first CSI is configured as P-CSI, the eNB should configure the reporting period and offset of the first CSI for the UE. First of all, the reporting period and offset of the first CSI may be configured independently of those of the second CSI. Or the reporting period and offset of the first CSI may be configured to be references for the reporting period and offset of the second CSI, and thus may be set relatively. A detailed description will be given below of each of the two cases.

A. When the reporting period and offset of the first CSI are configured independently of those of the second CSI, the legacy period and offset configuration method may be used to configure the reporting period and offset of the first CSI.

In the legacy configuration method, the period Npd and offset $N_{offset,CQI}$ of a minimum unit for reporting a CQI are configured, and the periods and offsets of an RI, W1 and a CRI are calculated to be multiples of Npd and offsets relative to $N_{offset,CQI}$ by [Equation 11] to [Equation 14].

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 11]—RI period}$$

$$(10 \times n_f + \lfloor n_s/2 \rfloor - N_{OFFSET,CQI}) \bmod (H' \cdot N_{pd}) = 0 \quad \text{[Equation 12]—Feedback period of W1 only}$$

$$(10 \times n_f + \lfloor n_s/2 \rfloor - N_{OFFSET,CQI} - N_{OFFSET,CRI}) \bmod (H \cdot N_{pd} \cdot M_{CRI}) = 0 \quad \text{[Equation 13]—Feedback period of CRI only}$$

$$(10 \times n_f + \lfloor n_s/2 \rfloor - N_{OFFSET,CQI} - N_{OFFSET,RI}) \bmod (H \cdot N_{pd} \cdot M_{RI} \cdot M_{CRI}) = 0 \quad \text{[Equation 14]—Feedback period of CRI+RI}$$

A case in which the legacy configuration method is used in configuring the period and offset of first CSI will be described. In mechanism 1, since the first CSI includes an RI and W1, there is no periodic report of a CQI and a CRI. However, to conform to the legacy configuration method, the eNB may configure a period and an offset for the CQI, and then a period and an offset for the first CSI based on the period and offset of the CQI. Although the period and offset of the CQI are configured, these values are used only to configure the period and offset of the first CSI. In fact, the UE does not report a CQI at a reporting time. As such, when the period and offset of the first CSI are configured in the legacy period and offset configuration method, the UE reports no CSI at the remaining configured (periodic) reporting times except for the reporting time of the first CSI (i.e., the UE ignores the remaining (periodic) reporting times).

When the period and offset of the first CSI are configured in the legacy period and offset configuration method, the eNB configures $N_{offset,CQI}$, $N_{offset,RI}$, Npd, and $M_{RI}$ for the UE, and the period and offset of the first CSI are determined by [Equation 11]. It is to be noted that considering that the CQI is not actually reported, $N_{offset,RI}$ may be fixed to a specific value (e.g., 0), which may simplify an RRC configuration.

When the period and offset of the first CSI are configured in the legacy W1 period configuration method, the eNB configures $N_{offset,CQI}$, Npd, and H' for the UE, and the period and offset of the first CSI are determined by [Equation 12]. However, since an existing H' value is limited to a small value, it is preferable to redefine H' so as to configure H' to be a large value.

When the period and offset of the first CSI are configured in the legacy CRI period configuration method, the eNB configures $N_{offset,CQI}$, $N_{offset,CRI}$, Npd, and $M_{CRI}$ for the UE, and the period and offset of the first CSI are determined by [Equation 13]. Or when the period and offset of the first CSI are configured in the legacy CRI period configuration method, the eNB configures $N_{offset,CQI}$, $N_{offset,RI}$, Npd, $M_{CRI}$, and $M_{RI}$ for the UE, and the period and offset of the first CSI are determined by [Equation 14].

When the legacy RI/W1/CRI period configuration method is used as described above, a related period and offset may be named independently for the purpose of hybrid CSI. If the existing parameter names are still used, confusion with a legacy CSI reporting configuration may make a UE operation unclear. Therefore, the independent parameter naming is intended to prevent the ambiguity of the UE operation.

Meanwhile, in hybrid CSI reporting mechanism 1, the first CSI is divided into the first RI and the first W1. If the first RI and the first W1 are reported at one time in one PUCCH format, one of the proposed methods may be used. For example, if the legacy CRI period configuration method is used, the eNB configures $N_{offset,CQI}$, $N_{offset,RI}$, Npd, $M_{CRI}$, and $M_{RI}$, but the UE reports only the first RI and the first W1 without reporting the CQI, CRI, and W2. Therefore, the UE does not report the CQI, CRI, and W2 at reporting times corresponding to the CQI, CRI, and W2. Instead, the UE reports the first RI and the first W1 only in subframes satisfying [Equation 4].

If the first RI and the first W1 should be reported at different times due to too large a payload size, the same period is shared between the first RI and the first W1, while reporting times may be separated by signaling offsets separately for the first RI and the first W1 in the foregoing proposed method. For example, when the legacy CRI period configuration method is used, the first RI may be reported in a subframe satisfying [Equation 15] below, and the first W1 may be reported in a subframe satisfying [Equation 16].

$$(10 \times n_f + \lfloor n_s/2 \rfloor - N_{OFFSET,CQI} - N_{OFFSET,RI\_1}) \bmod (H \cdot N_{pd} \cdot M_{RI} \cdot M_{CRI}) = 0 \quad \text{[Equation 15]}$$

$$(10 \times n_f + \lfloor n_s/2 \rfloor - N_{OFFSET,CQI} - N_{OFFSET,RI\_2}) \bmod (H \cdot N_{pd} \cdot M_{RI} \cdot M_{CRI}) = 0 \quad \text{[Equation 16]}$$

Also in this case, the UE does not report the CQI, CRI, and W2 at reporting periods of the CQI, the CRI, and W2.

Also in hybrid CSI reporting mechanism 2, the first CSI may be reported in the same manner. Herein, the first CSI includes only the first CRI.

In the above proposal, the period and offset of the first CSI are determined relatively to the period and offset of the CQI. However, the period and offset of the first CSI may be configured without using the period and offset of the CQI by [Equation 17]. Notably, $N_{offset,1st\ CSI}$ and $N_{1st\ CSI}$ need to be defined as a new table in [Equation 17].

$$(10 \times n_f + \lfloor n_s/2 \rfloor - N_{OFFSET,1stCSI}) \bmod (H' \cdot N_{1stCSI}) = 0 \quad \text{[Equation 17]}$$

B. When the period and offset of the first CSI are determined relatively to the period and offset of the second CSI which are used as references, for example, the period of the first CSI may be determined to be a multiple of the period of the second CSI, and the offset of the first CSI may be applied based on the offset of the second CSI. The offsets of the second CSI and the first CSI are signaled separately, and a final subframe offset for the first CSI is calculated by applying both of the offsets of the first CSI and the second CSI.

In this case, while the period and offset of the second CSI are signaled, these values are used only in configuring the period and offset of the first CSI, and nothing should actually be reported at a reporting time of the second CSI. This is because the second CSI is reported as AP-CSI to the eNB.

However, ambiguity exists in a UE operation as follows. It is not clear which one between a method of reporting both first CSI and second CSI as P-CSI (method B1) and a method of reporting first CSI as P-CSI and second CSI as AP-CSI (method B2) is to be performed by the UE. This is because the period and offset of the first CSI and the period and offset of the second CSI are all configured in method B1 as well as method B2. If the eNB intends to adopt method B1, the UE should report nothing at a reporting time of the second CSI, and if the eNB intends to adopt method B2, the UE should report second CSI at a reporting time of the second CSI. Therefore, the eNB should indicate which one between method B1 and method B2 is used for CSI reporting to the UE by RRC signaling or DCI. For this purpose, a 1-bit flag may be introduced.

On the contrary, if the reporting period and offset of the first CSI are configured independently of those of the second CSI, the ambiguity does not exist. This is because in method B1, the eNB will indicate all of the periods and offsets of the first CSI and the second CSI to the UE, and in method B2, the eNB will indicate only the period and offset of the first CSI to the UE. That is, this is because the two methods may be distinguished from each other by signaling that configures a period and an offset.

Further, irrespective of whether the reporting period and offset of the first CSI are configured independently of those of the second CSI, or determined relatively, serving as references for the reporting period and offset of the second CSI, the eNB should not configure method B1 and method B2 simultaneously for the UE. In other words, the UE does not expect the eNB to configure method B1 and method B2 simultaneously. Since method B1 and method B2 contradict each other in the sense of disabling/enabling the periodic feedback of the second CSI, a UE operation is ambiguous regarding simultaneous configuration of the two methods.

On the other hand, if method B3 is defined as a "method of transmitting both first CSI and second CSI as AP-CSI", method B1 and method B3 may be configured simultaneously, and method B2 and method B3 may be configured simultaneously. If method B1 and method B3 are configured simultaneously, the first CSI and the second CSI are transmitted periodically, and when needed (e.g., when one of the first CSI and the second CSI is dropped or ambiguity occurs between the eNB and the UE regarding an RRC reconfiguration period for P-CSI), the eNB may trigger both of the first CSI and the second CSI or selectively trigger one of the first CSI and the second CSI, for AP-CSI reporting. If method B2 and method B3 are configured simultaneously, the first CSI is transmitted periodically, and when needed, the eNB may trigger AP-CSI reporting of the second CSI. Or when the first CSI is dropped or ambiguity occurs between the eNB and the UE regarding an RRC reconfiguration period for P-CSI, the eNB may trigger AP-CSI reporting of the first CSI. Or when needed, the eNB may trigger AP-CSI reporting for both of the first CSI and the second CSI.

Additionally, the following operation may be performed in hybrid CSI reporting mechanism 1. Also in hybrid CSI reporting mechanism 2, a period and an offset are configured for CSI of the first eMIMO type, that is, CSI(1) in the same manner.

- The period of the first eMIMO-type CSI is an integer multiple of the period of the second eMIMO-type RI, $RI^{(2)}$.
- The subframe offset of the first eMIMO-type CSI is determined by the subframe offset of the second eMIMO-type RI, $RI^{(2)}$.
- For periodic CSI reporting in hybrid CSI reporting mechanism 1, a subframe offset may be configured for $CSI^{(1)}$ (i.e., $PMI^{(1)}$ and $RI^{(1)}$, or $PMI^{(1)}$ only). In this case, a legacy CRI period and offset configuration may be reused for the period and offset of $CSI^{(1)}$, as illustrated in Table 6 below.

TABLE 6

| $I_{CSI}^{(1)}$ | Value of $M_{CSI}^{(1)}$ | Value of $N_{OFFSET, CSI}^{(1)}$ |
|---|---|---|
| $0 \le I_{CSI}^{(1)} \le 160$ | 1 | $-I_{CSI}^{(1)}$ |
| $161 \le I_{CSI}^{(1)} \le 321$ | 2 | $-(I_{CSI}^{(1)} - 161)$ |
| $322 \le I_{CSI}^{(1)} \le 482$ | 4 | $-(I_{CSI}^{(1)} - 322)$ |
| $483 \le I_{CSI}^{(1)} \le 643$ | 8 | $-(I_{CSI}^{(1)} - 483)$ |
| $644 \le I_{CSI}^{(1)} \le 804$ | 16 | $-(I_{CSI}^{(1)} - 644)$ |
| $805 \le I_{CSI}^{(1)} \le 965$ | 32 | $-(I_{CSI}^{(1)} - 805)$ |
| $966 \le I_{CSI}^{(1)} \le 1023$ | | Reserved |

Further, in hybrid CSI reporting mechanism 1, the first eMIMO-type CSI has a higher priority than the legacy CSI or the second eMIMO-type CSI. However, the following new porting types having a highest priority should be defined.

Type $5^{(1)}$ for reporting $RI^{(1)}$ and $W1^{(1)}$
Type $2a^{(1)}$ for reporting $W1^{(1)}$ only It is to be noted that the second eMIMO-type CSI conforms to the legacy CSI prioritization rule.

In hybrid CSI reporting mechanism 2, if the first CSI is defined as $CRI^{(1)}$ only, a new reporting type for reporting $CRI^{(1)}$, reporting type $10^{(1)}$ other than a legacy reporting type for reporting a CRI, that is, reporting type 10 is introduced, and has a higher priority than the legacy reporting type. Or it is proposed that the newly defined reporting type has a priority equal to that of the legacy CRI.

<Relaxation in Hybrid CSI>

A relaxation method in hybrid CSI, that is, a method of determining what CSI is to be calculated or updated on the part of a UE may be defined as follows.

For an initial AP-CSI feedback trigger for a corresponding CSI process, which is received N subframes after reception of a first eMIMO-type CSI-RS (hereinbelow, referred to as a first CSI-RS) from the eNB, the UE calculates (updates) first CSI while not calculating (updating) second CSI. For any other AP-CSI feedback trigger than the initial AP-CSI feedback trigger, the second CSI is calculated (updated), while the first CSI is not calculated (updated). This operation will be described with reference to a drawing.

Figure 12:
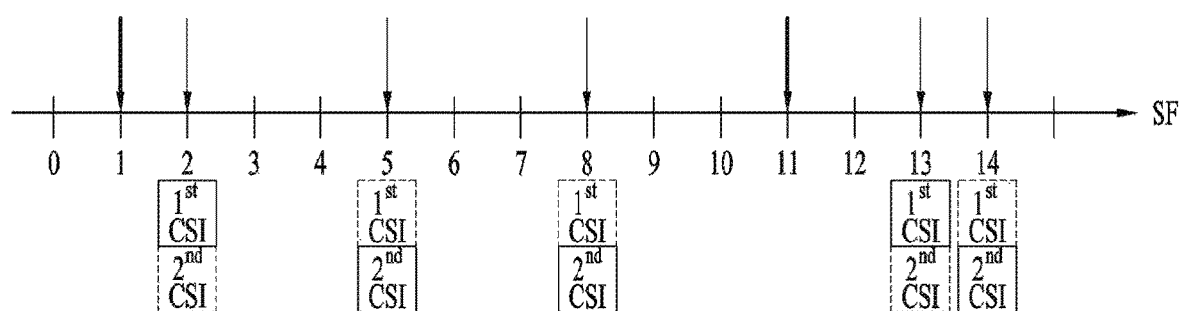
FIG. 12 is an exemplary view illustrating a CSI relaxation method for hybrid CSI according to an embodiment of the present invention.
Figure 12:
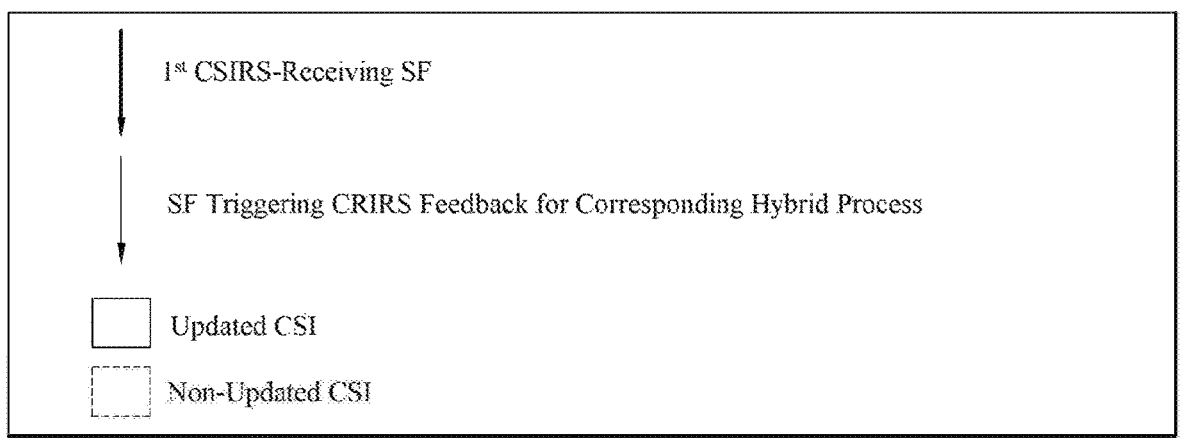

FIG. 12 illustrates an exemplary CSI relaxation method in hybrid CSI according to an embodiment of the present invention.

Referring to FIG. 12, the UE receives a first CSI-RS in subframe 1 and subframe 11. As the UE receives an initial AP-CSI feedback trigger in subframe 2 after the reception of the first CSI-RS, the UE updates first CSI without updating second CSI. As the UE receives a second AP-CSI feedback trigger and a third AP-CSI feedback trigger in subframe 5 and subframe 8, respectively after the reception of the first CSI-RS, the UE updates the second CSI without updating the first CSI. As the UE receives a new first CSI-RS in subframe 11 and then receives an initial AP-CSI feedback trigger in subframe 13, the UE updates the first CSI without updating the second CSI. As the UE receives a second AP-CSI feedback trigger in subframe 14 after the reception of the first CSI-RS, the UE updates the second CSI without updating the first CSI.

While it has been defined above that for an initial AP-CSI feedback trigger (for a corresponding hybrid CSI process) received from the eNB, N subframes after reception of a new first CSI-RS, the UE calculates (updates) first CSI without calculating (updating) second CSI, for an initial AP-CSI feedback trigger (for a corresponding hybrid CSI process) received from the eNB, with respect to a reception time of a new first CSI-RS (i.e., including the reception time of the first CSI-RS), the UE may calculate (update) first CSI without calculating (updating) second CSI. As a consequence, if a trigger is configured in subframe 1, the first CSI is updated.

Further, while the above proposal is made based on a triggering time, the same thing may apply based on a CSI reference resource time instead of a triggering time. Now, a description will be given of the present invention in the context of a reference resource.

For an initially defined CSI reference resource N subframes after reception of a new first CSI-RS, the UE calculates (updates) first CSI without calculating (updating) second CSI. For any other CSI reference resource than the initially defined CSI reference resource, the UE calculates (updates) the second CSI without calculating (updating) the first CSI.

Figure 13:
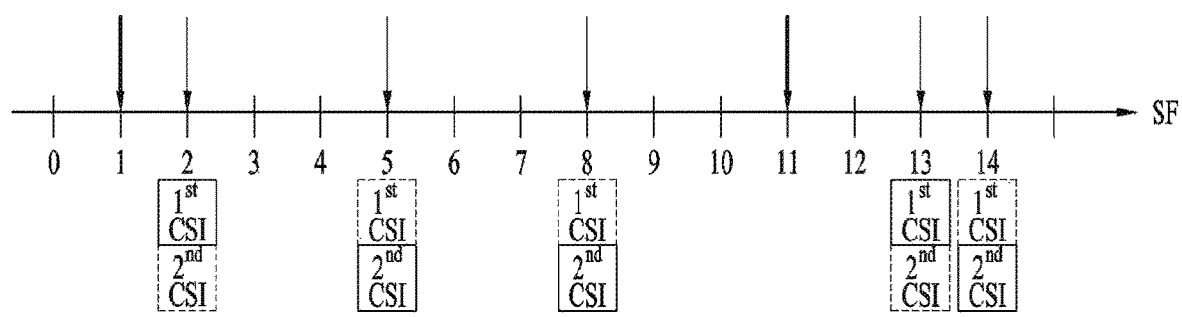
FIG. 13 is an exemplary view illustrating another CSI relaxation method for hybrid CSI according to an embodiment of the present invention.
Figure 13:
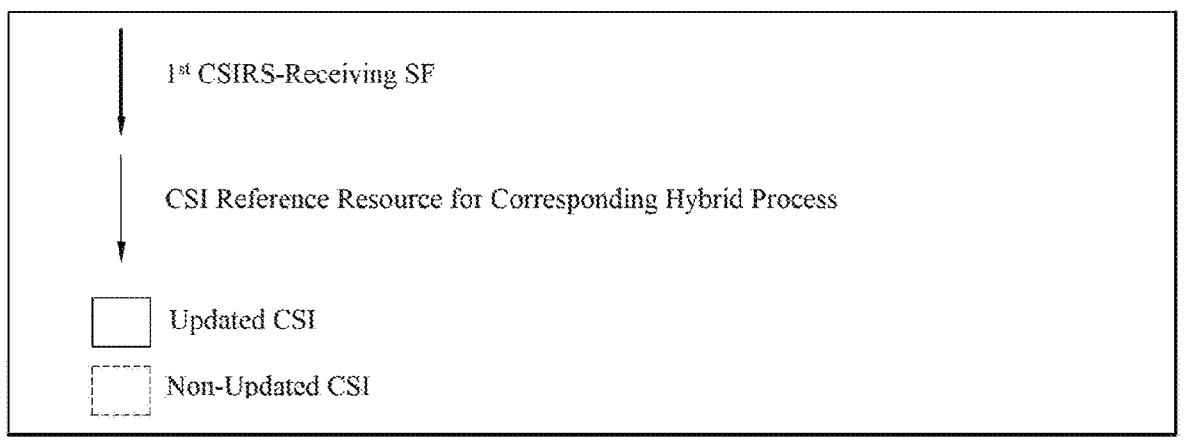

FIG. 13 illustrates another exemplary CSI relaxation method in hybrid CSI according to an embodiment of the present invention.

Referring to FIG. 13, the UE receives a first CSI-RS in subframe 1 and subframe 11. As an initial CSI reference resource is defined in subframe 2 after the reception of the first CSI-RS, the UE updates first CSI without updating second CSI. As a second CSI reference resource and a third CSI reference resource are defined respectively in subframe 5 and subframe 8 after the reception of the first CSI-RS, the UE updates the second CSI without updating the first CSI.

As an initial reference resource is defined in subframe 13 after reception of a new first CSI-RS in subframe 11, the UE updates the first CSI without updating the second CSI. As a second initial reference resource is defined in subframe 14 after the reception of the new first CSI-RS in subframe 11, the UE updates the second CSI without updating the first CSI.

Additionally, for an initially defined CSI reference resource with respect to a reception time of a new first CSI-RS (i.e., including the reception time of the first CSI-RS), the UE may calculate (update) first CSI without calculating (updating) second CSI. As a consequence, if a reference resource is configured in subframe 1, the first CSI is updated.

Meanwhile, if an AP-CSI reporting trigger for a corresponding CSI process is a trigger for first CSI in FIG. 12, the UE reports updated first CSI (i.e., calculates and reports the first CSI) only for an initial trigger from a subframe in which a first eMIMO-type CSI-RS is received until before receiving the next first eMIMO-type CSI-RS, and reports non-updated first CSI (i.e., reports the previously calculated value without calculating the first CSI) for the subsequent triggers. Or the UE performs the foregoing operation from a subframe carrying a first eMIMO-type CSI-RS+N (e.g., N=1) until receiving the next first eMIMO-type CSI-RS. Further, parts corresponding to the second CSI in FIGS. 12 and 13 are not necessary in view of the assumption of triggers for first CSI.

For example, if a reference resource for a corresponding CSI process is a reference resource for first CSI in FIG. 13, the UE reports updated first CSI (i.e., calculates and reports the first CSI) only for an initial reference resource from a subframe in which a first eMIMO-type CSI-RS is received until before receiving the next first eMIMO-type CSI-RS, and reports non-updated first CSI (i.e., reports the previously calculated value without calculating the first CSI) for the subsequent triggers. Or the UE performs the foregoing operation from a subframe carrying a first eMIMO-type CSI-RS+N (e.g., N=1) until receiving the next first eMIMO-type CSI-RS.

Meanwhile, in FIG. 12, a first eMIMO-type CSI-RS is received in subframe 1, and a new first eMIMO-type CSI-RS is received in subframe 11 due to the 10-ms period of the CSI-RS. Notably, a triggering time is linked to a reference resource time, and the relationship between the triggering time and the reference resource time is determined according to the number of CSI processes configured for the UE. That is, if a single CSI process is configured for the UE, the triggering time coincides with the reference resource time, whereas if a plurality of CSI processes are configured, the reference resource time is defined to be the triggering time-1.

If the triggering time coincides with the reference resource time, upon receipt of a trigger for first CSI, CSI is calculated by using the latest CSI-RS from a time of receiving the latest CSI-RS until receiving the next CSI-RS in FIG. 12. Therefore, if a plurality of triggers for first CSI are received from the reception time of the latest CSI-RS until before the reception of the next CSI-RS, the problem occurs that CSI is calculated based on the same CSI-RS for all of the triggers for first CSI. In this context, the following is proposed to prevent redundant calculation of the same CSI based on the same CSI-RS.

If $CSI^{(1)}$ for the same CSI-RS transmission of the $1^{st}$ eMIMO-type is triggered multiple times, the UE is required to update $CSI^{(1)}$ only once for the initial trigger.

If $CSI^{(1)}$ for the same CSI-RS transmission of the $1^{st}$ eMIMO-type is triggered multiple times, the UE is not required to update $CSI^{(1)}$ more than once.

If the reference resource time is defined to be the triggering time-1, upon receipt of a trigger for first CSI, CSI is calculated by using the latest CSI-RS from a time of receiving the latest CSI-RS+1 until receiving the next CSI-RS. Therefore, if a plurality of trigger for first CSI are received from the reception time of the latest CSI-RS+1 until the reception of the next CSI-RS, the problem occurs that CSI is calculated based on the same CSI-RS for all of the trigger for first CSI. Also in this case, the following is proposed to prevent redundant calculation of the same CSI based on the same CSI-RS.

If $CSI^{(1)}$ for the same CSI-RS transmission of the $1^{st}$ eMIMO-type is triggered multiple times, the UE is required to update $CSI^{(1)}$ only once for the initial trigger.

If $CSI^{(1)}$ for the same CSI-RS transmission of the $1^{st}$ eMIMO-type is triggered multiple times, the UE is not required to update $CSI^{(1)}$ more than once.

Meanwhile, the first CSI carries only beam group information for beamforming of a second eMIMO-type CSI-RS, and thus is calculated for a first eMIMO-type CSI-RS transmitted over a long term. That is, the first CSI is long-term information, and is intended to determine a beam group, separately from a CQI. Accordingly, there is no need for considering interference for the first CSI, unlike calculation of the legacy CSI. Instead, the first CSI should be calculated only based on a channel estimated from a first eMIMO-type CSI-RS. Further, considering that the first eMIMO-type CSI-RS is transmitted with a long period, calculation of an accuracy by interpolating a plurality of CSI-RSs is not helpful. Therefore, the UE calculates the first CSI only by using the latest received first eMIMO-type CSI-RS.

In one method, after determining the dominant eigen vector of estimated channels, the UE selects a beam group having a highest correlation with the dominant eigen vector, and reports the selected beam group. The UE eventually uses only the latest received first eMIMO-type CSI-RS without using an IMR in calculating the first CSI. That is, For a first eMIMO-type CSI-RS, a second eMIMO-type CSI-RS, and an IMR defined in a hybrid CSI process, the IMR is not used for calculating first CSI, whereas the IMR is used for calculating second CSI. Or an IMR defined in a hybrid CSI process has no relation to a first eMIMO-type CSI-RS, and is linked to a second eMIMO-type CSI-RS. In a structure in which an IMR may be defined separately per CSI-RS, an IMR (i.e., a linked IMR) should be configured only for a second eMIMO-type CSI-RS, not a first eMIMO-type CSI-RS.

Meanwhile, the UE uses a first eMIMO-type CSI-RS for calculating only first CSI, not second CSI during a time (e.g., 4 subframes) taken to calculate the CSI using the CSI-RS from the reception time of the first eMIMO-type CSI-RS (e.g., subframe #n). This operation will be described with reference to a drawing.

Figure 14:
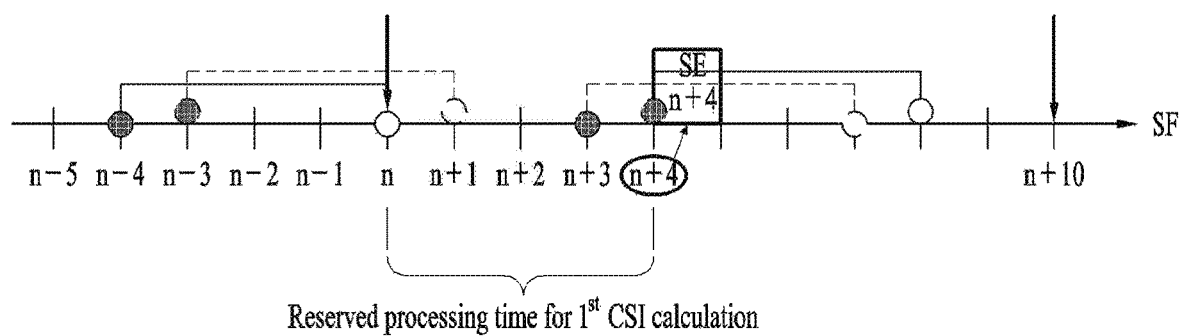
FIG. 14 is an exemplary view illustrating hybrid CSI reporting according to an embodiment of the present invention.
Figure 14:
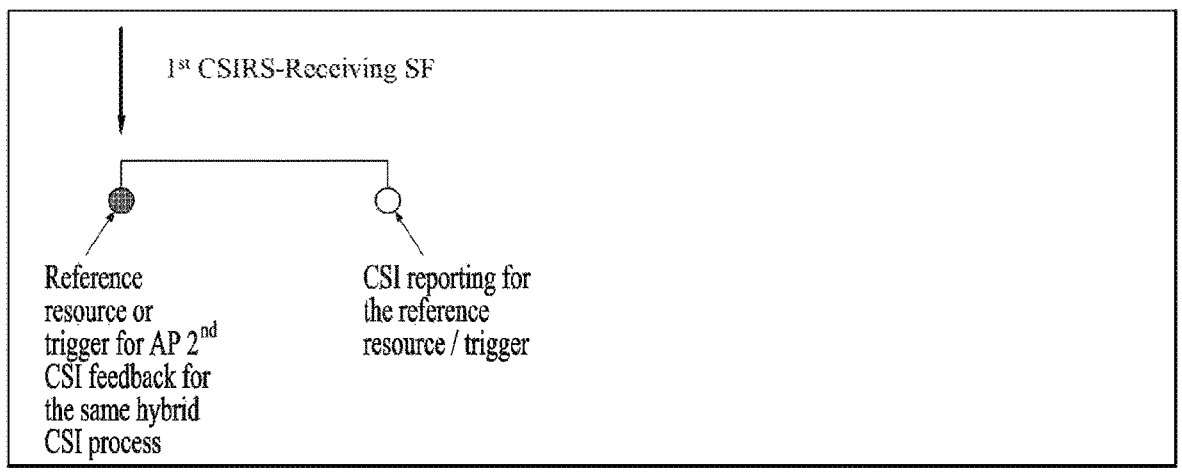

FIG. 14 illustrates an example of carrying out hybrid CSI reporting according to an embodiment of the present invention.

Referring to FIG. 14, only first CSI is calculated in subframes #n to subframe #n+3 including a time when a first eMIMO-type CSI-RS is received, that is, subframe #n (the first eMIMO-type CSI-RS has a period of 10 ms). If any of subframe #n to subframe #n+3 is used for calculating second CSI (for the same CSI process) due to an AP-CSI feedback trigger for the second CSI, the UE does not calculate (update) the second CSI.

For example, when the eNB triggers second CSI reporting at the time of subframe #n−4, the UE completes calculation of second CSI in subframe #n−4 to subframe #n−1. In this case, since the subframes reserved for calculating the first CSI, that is, subframe #n to subframe #n+3 do not overlap with the subframes for calculating the second CSI, the second CSI is calculated.

On the other hand, if the eNB triggers second CSI reporting in subframe #n−3, the UE completes calculation of second CSI in subframe #n−3 to subframe #n. In this case, since subframe #n among the subframes reserved for calculating the first CSI, that is, subframe #n to subframe #n+3 overlaps with the subframes for calculating the second CSI, the second CSI is not calculated. Instead, non-updated second CSI is reported. That is, upon receipt of a first eMIMO-type CSI-RS in subframe #n, the UE reports non-updated CSI without calculating second CSI for a second CSI reporting trigger received in subframe #n−3 to subframe #n+3.

If the UE has received any trigger for first CSI before subframe #n, the UE may have calculated the first CSI for a previously received first eMIMO-type CSI-RS in subframe #n−10 to subframe #n−7. Thus, the UE has only to report the calculated CSI. If the UE has received any trigger for first CSI in subframe #n, the UE calculates CSI by using already secured subframe #n to subframe #n+3, and reports the CSI in subframe #n+4. Further, if the UE has received any trigger for first CSI after subframe #n, the UE may have calculated CSI for the first eMIMO-type CSI-RS received in subframe #n in subframe #n to subframe #n+3. Thus, the UE may report the calculated CSI.

In FIG. 14, regarding a triggering and reporting combination denoted by a dotted line, since CSI calculation overlaps with a CSI processing time reserved for first CSI, the corresponding CSI is not updated, and non-updated CSI is reported. In contrast, regarding a triggering and reporting combination denoted by a solid line, since CSI calculation does not overlap with the CSI processing time reserved for the first CSI, the corresponding CSI is updated and reported. In FIG. 14, triggering and reporting of second CSI are denoted by a dotted line or a sold line. While triggering of first CSI is not shown in FIG. 14, the UE operates in the same manner as described above.

The above proposal obviates calculation of second CSI during calculation of first CSI, thereby reducing implementation complexity for CSI calculation at the UE.

Figure 15:
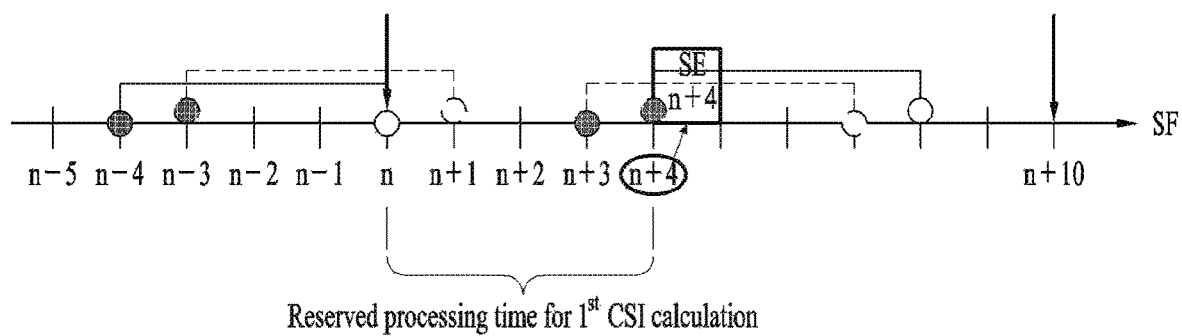
FIG. 15 is another exemplary view illustrating hybrid CSI reporting according to an embodiment of the present invention.
Figure 15:
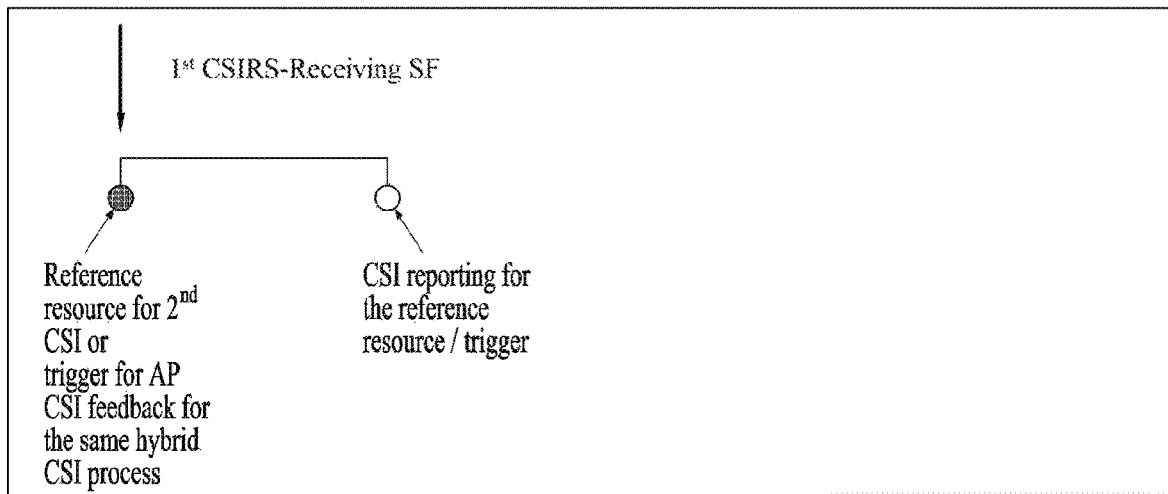

FIG. 15 illustrates another example of carrying out hybrid CSI reporting according to an embodiment of the present invention. Compared to FIG. 14, particularly, both of first CSI and second CSI are always triggered, and a reference resource time for the second CSI coincides with a triggering time in FIG. 15. A reference resource for the first CSI is fixed to a subframe carrying the latest received first eMIMO-type CSI-RS. Since triggers for both of the first CSI and the second CSI are always received at the same time, both of a UE operation for the first CSI and a UE operation for the second CSI are performed in the proposal described with reference to FIG. 14.

Referring to FIG. 15, only first CSI is calculated in subframe #n to subframe #n+3 including a time when a first eMIMO-type CSI-RS is received, that is, subframe #n (the first eMIMO-type CSI-RS has a period of 10 ms). If any of subframe #n to subframe #n+3 is used for calculating second CSI (for the same CSI process) due to an AP-CSI reporting trigger, the UE does not calculate or update the second CSI.

For example, if the eNB triggers CSI in subframe #n−4, the UE completes calculating second CSI in subframe #n−4 to subframe #n−1. The UE reports already calculated first CSI (i.e., non-updated first CSI). In this case, due to no overlap with the subframes reserved for calculation of the first CSI, that is, subframe #n to subframe #n+3, the second CSI is calculated. In the case of no overlap with the subframes reserved for calculation of the first CSI, that is, subframe #n to subframe #n+3, the second CSI is updated and reported, and otherwise, non-updated second CSI is reported.

Meanwhile, if the eNB triggers CSI reporting for a corresponding CSI process at the time of subframe #n−3, the UE completes calculating CSI in subframe #n−3 to subframe #n. In this case, due to overlap with subframe #n among subframes reserved for calculation of the first CSI, that is, subframe #n to subframe #n+3, non-updated second CSI and non-updated first CSI are reported, without calculating the second CSI. That is, if the UE receives a first eMIMO-type CSI-RS in subframe #n, the UE reports non-updated CSI without calculating the second CSI/the first CSI for a CSI reporting trigger for a corresponding CSI process, received in subframe #n−3 to subframe #n−1. For a CSI reporting trigger for the corresponding CSI process, received in subframe #n to subframe #n+3, the UE reports non-updated second CSI without calculating the second CSI, and reports first CSI calculated based on a CSI-RS received in subframe #n. For a CSI reporting trigger for the corresponding CSI process, received from subframe #n+4, the UE calculates and reports second CSI, and reports first CSI calculated based on a CSI-RS received in subframe #n.

FIGS. 12 to 15 are based on the assumption that all of CSI triggering, CSI reporting, and CSI-RS transmission relate to the same hybrid CSI process. Further, a second eMIMO-type CSI-RS is transmitted with a shorter period than a first eMIMO-type CSI-RS. For the convenience of description, only the first eMIMO-type CSI-RS is shown without the second eMIMO-type CSI-RS in the drawings.

Figure 16:
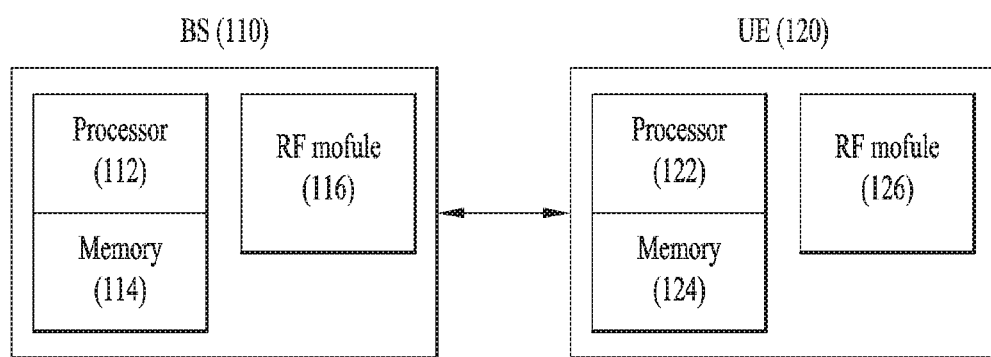
FIG. 16 is a block diagram of a base station (BS) and a UE, which are applicable to an embodiment of the present invention.

FIG. 16 is a block diagram of a BS and a UE which are applicable to an embodiment of the present invention.

Referring to FIG. 16, a wireless communication system includes a BS 110 and a UE 120. The BS 110 includes a processor 112, a memory 114, and a radio frequency (RF) unit 116. The processor 112 may be configured to implement the procedures and/or methods proposed in the present invention. The memory 114 is connected to the processor 112, and stores various types of information related to operations of the processor 112. The RF unit 116 is connected to the processor 112, and transmits and/or receives wireless signals. The UE includes a processor 122, a memory 124, and an RF unit 126. The processor 122 may be configured to implement the procedures and/or methods proposed in the present invention. The memory 124 is connected to the processor 122, and stores various types of information related to operations of the processor 122. The RF unit 126 is connected to the processor 122, and transmits and/or receives wireless signals. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The memory unit is located inside or outside the processor, and may transmit and receive data to and from the processor by various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for feeding back hybrid CSI in a multi-antenna system have been described above in the context of a 3GPP LTE system, the method and apparatus are also applicable to various wireless communication systems other than the 3GPP LTE system.

The invention claimed is:

1. A method of reporting channel status information (CSI) to a base station by a terminal in a wireless communication system, the method comprising:
receiving information about one CSI process including a first enhanced multiple input multiple output (eMIMO) type and a second eMIMO type through a higher layer;
receiving a first channel status information-reference signal (CSI-RS) corresponding to the first eMIMO type;
periodically reporting first CSI measured based on the first CSI-RS to the base station;
receiving a second CSI-RS corresponding to the second eMIMO type, beamformed based on the first CSI; and
periodically reporting second CSI measured based on the second CSI-RS to the base station,
wherein a priority of the first CSI is set to be equal to a priority of a CSI-RS resource indicator (CRI).

2. The method according to claim 1, wherein if the first CSI including a precoding matrix index (PMI) collides with the second CSI including a rank indicator (RI), the second CSI is dropped.

3. The method according to claim 1, wherein a reporting period of the first CSI is determined to be a multiple of a longest reporting period of the second CSI.

4. The method according to claim 3, wherein the longest reporting period of the second CSI is a reporting period of an RI included in the second CSI.

5. The method according to claim 4, wherein if the RI is not included in the second CSI, the longest reporting period of the second CSI is a reporting period of a channel quality indicator (CQI) included in the second CSI.

6. The method according to claim 3, wherein an offset for the reporting period of the first CSI is determined based on an offset for the longest reporting period of the second CSI.

7. A terminal in a wireless communication system, the terminal comprising:
a wireless communication module configured to transmit and receive signals to and from a base station; and
a processor configured to process the signals,
wherein the processor is configured to receive information about one CSI process including a first enhanced multiple input multiple output (eMIMO) type and a second eMIMO type through a higher layer, to periodically report, to the base station, first CSI measured based on a first channel status information-reference signal (CSI-RS) corresponding to the first eMIMO type, and to periodically report second CSI measured based on a second CSI-RS corresponding to the second eMIMO type, beamformed based on the first CSI, and
wherein a priority of the first CSI is set to be equal to a priority of a CSI-RS resource indicator (CRI).

8. The terminal according to claim 7, wherein if the first CSI including a precoding matrix index (PMI) collides with the second CSI including a rank indicator (RI), the second CSI is dropped.

9. The terminal according to claim 7, wherein a reporting period of the first CSI is determined to be a multiple of a longest reporting period of the second CSI.

10. The terminal according to claim 9, wherein the longest reporting period of the second CSI is a reporting period of an RI included in the second CSI.

11. The terminal according to claim 10, wherein if the RI is not included in the second CSI, the longest reporting period of the second CSI is a reporting period of a channel quality indicator (CQI) included in the second CSI.

12. The terminal according to claim 9, wherein an offset for the reporting period of the first CSI is determined based on an offset for the longest reporting period of the second CSI.

* * * * *